INVENTORS
Arthur H. Fotsch, John R. Finley
Gilbert W. Ross, Richard F. Fischer
BY
Elroy J. Wutschel
Attorney INVENTORS
Arthur H. Fotsch, John R. Finley
Gilbert W. Ross, Richard H. Fischer
BY
Erny J. Wutschel
Attorney

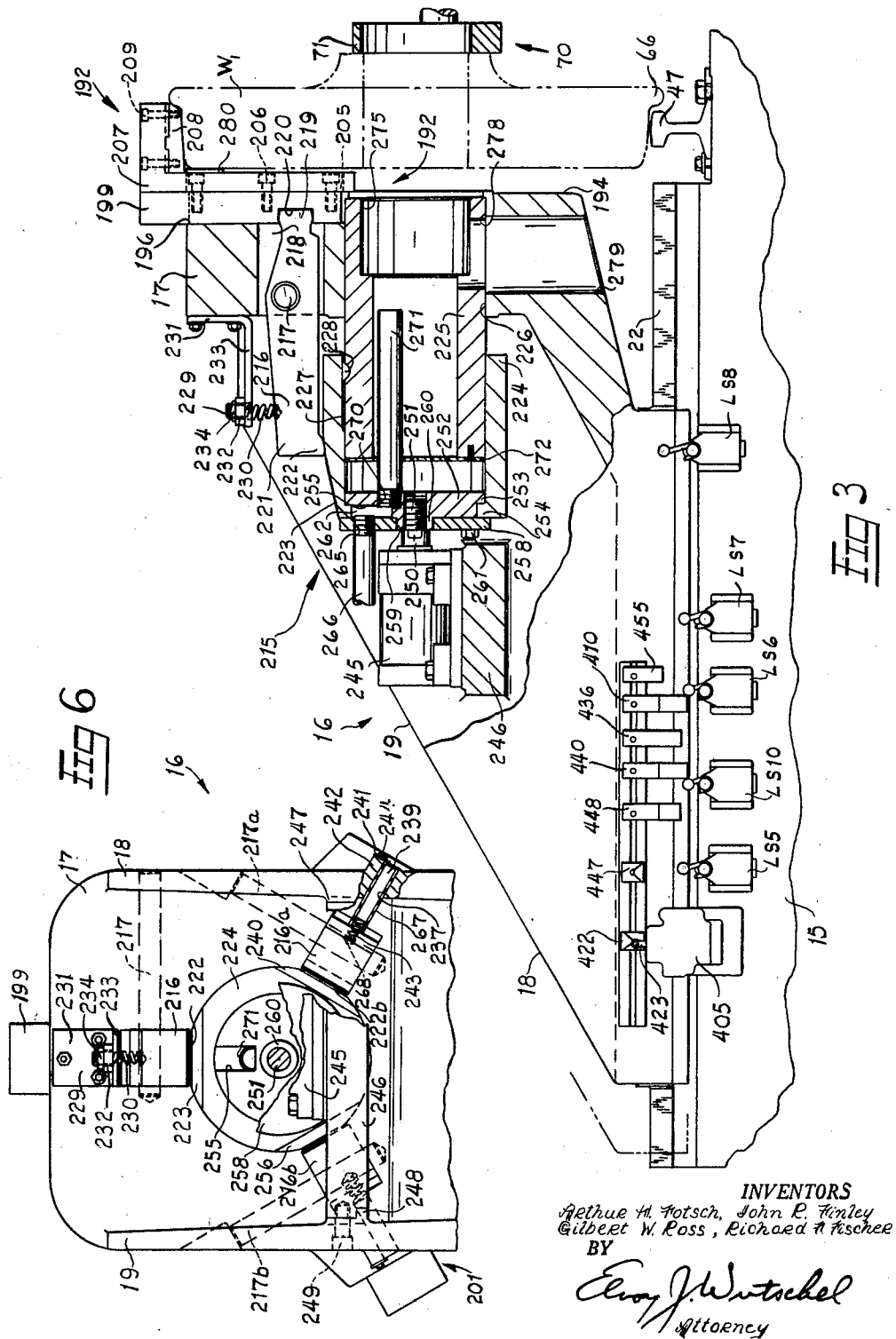

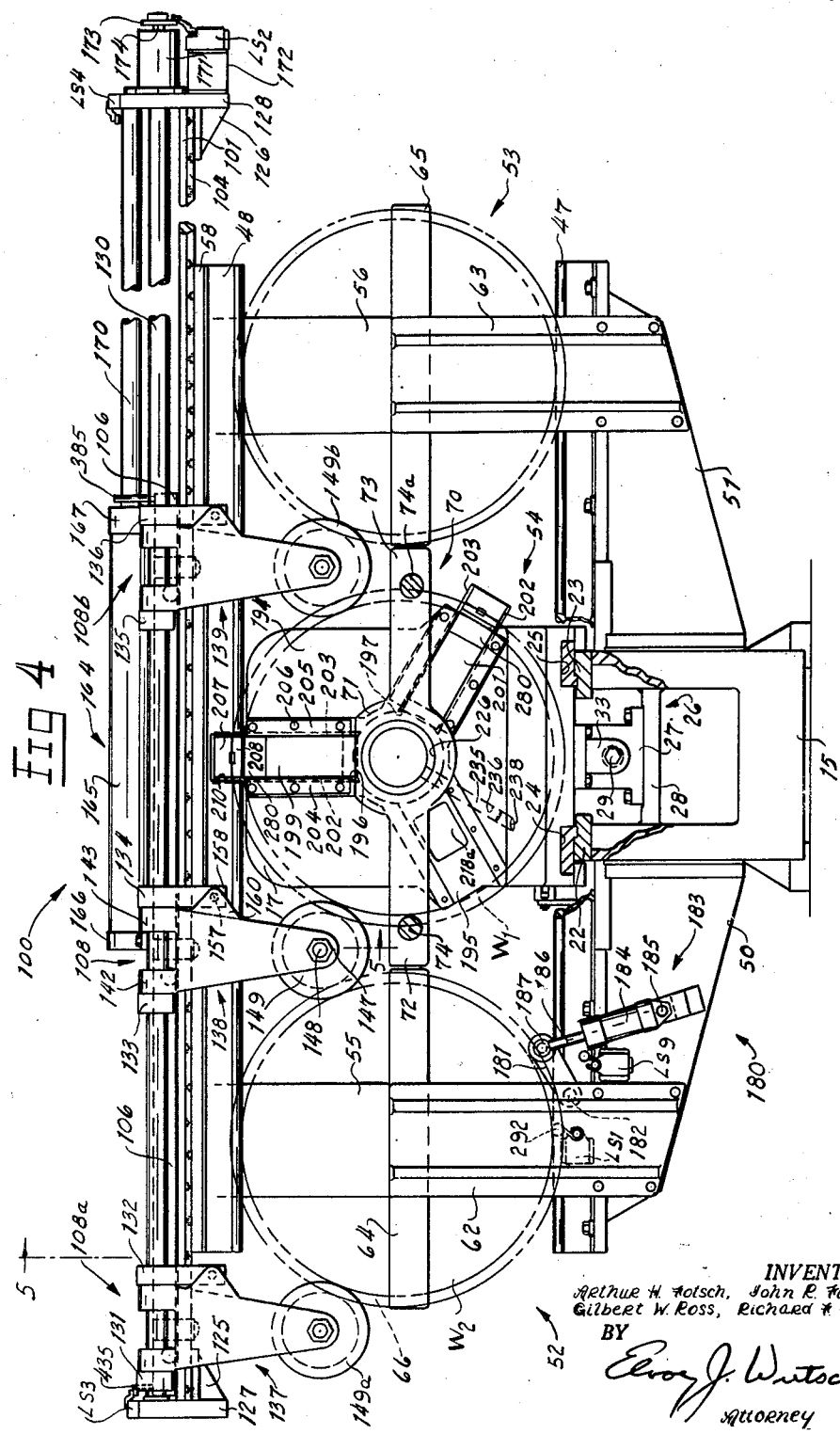

Fig. 7

June 15, 1965  A. H. FOTSCH ETAL  3,188,890
CAR WHEEL BORER WITH TRANSFER MECHANISM
Filed Feb. 6, 1958  7 Sheets-Sheet 6

INVENTORS
Arthur H. Fotsch, John R. Finley
Gilbert W. Ross, Richard F. Fischer
BY
Leroy J. Wutschel
Attorney June 15, 1965    A. H. FOTSCH ETAL    3,188,890
CAR WHEEL BORER WITH TRANSFER MECHANISM Filed Feb. 6, 1958

INVENTORS
Arthur H. Fotsch, John R. Finley
Gilbert W. Ross, Richard F. Fischer
BY
Emery J. Wutschel
Attorney United States Patent Office 3,188,890
Patented June 15, 1965

3,188,890
CAR WHEEL BORER WITH TRANSFER MECHANISM
Arthur H. Fotsch, Wauwatosa, John R. Finley, West Allis, Gilbert W. Ross, Brookfield, and Richard F. Fischer, Milwaukee, Wis., assignors to Kearney & Trecker Corporation, West Allis, Wis., a corporation of Wisconsin
Filed Feb. 6, 1958, Ser. No. 713,573
22 Claims. (Cl. 77—3)

This invention relates generally to machine tools, and in some of its aspects has more particular reference to a machine tool organization in which a workpiece may be supplied to the machine tool in a load or ready station and then automatically moved into a work position or station for the performance of a work operation and then moved out of the work station as another workpiece is moved into the work station.

A general object of the present invention is to provide an improved machine tool for performing a work operation on a circular workpiece in an upright position.

Another object of the present invention is to provide a machine tool organization wherein a circular workpiece may be automatically rolled into a work position while a finished workpiece is being rolled out of the work position.

Another object of the present invention is to provide a machine tool organization wherein railroad car wheels of different sizes, indiscriminately supplied to the machine tool in an upright condition and requiring the performance of a particular machining operation thereon, will be automatically moved into a work position and held in predetermined relationship to a boring tool for the performance of a selected boring operation.

Still another object of the present invention is to provide a machine tool having a fixture head and a tool head movable relative to each other and having means for guiding and rolling a railroad car wheel into a work position between the heads.

Another object of the present invention is to provide a machine tool having a fixture head adapted to receive and hold a circular workpiece and which is provided with an axial recess into which a tool performing a work operation on the workpiece held in the fixture head, may extend without interfering with the operation of the tool or the fixture head.

Another object of the present invention is to provide a production machine tool for boring the axial opening in railroad car wheels while the car wheels are maintained in an upright position.

Yet another object of the present invention is to provide a machine tool which is automatically operable to move railroad car wheels of different sizes, supplied to the machine tool into a work position and having chucking means automatically engageable with a car wheel in the work position and operable to position and hold the car wheel in axial alignment with a tool for a selected work operation and after a work operation has been completed is operable to move the car wheel out of work position.

Another object of the present invention is to provide a work fixture for a machine tool which is operable to position and hold a circular workpiece in a predetermined position and having means whereby at least one of the clamping elements is retractable so as to render the work fixture accessible for supplying workpieces thereto.

Another object of the present invention is to provide a work fixture which is operable to position and hold a circular workpiece in a predetermined position of alignment relative to a tool and which is automatic in its operation.

According to this invention there is provided an improved machine tool especially adapted for boring the hub of railroad car wheels wherein the car wheels are supplied to the machine tools and thereafter are automatically moved through the machine, without being handled by the operator. In the present embodiment, a single boring operation is performed on an individual car wheel. However, the car wheels as supplied to the machine may be an intermixture of different sizes requiring a smaller or larger opening. The machine tool comprises, in general, a base having a chuck head movable thereon towards and away from a tool carrying head fixed to the base. The car wheels are supplied to the machine from an independent source in an upright position and are held in readiness in the machine to await movement into a work position located between the two heads. A transfer mechanism is carried by the machine in position to engage a car wheel in the ready or load station and is operable to roll the car wheel into the work position or station. Upon completion of a transfer movement, the transfer mechanism trips a switch which causes the car wheel engaging members of the transfer mechanism to be moved out of engagement with the car wheel and after being so moved another switch is tripped which causes the chuck head to be actuated into a position so that a chuck mechanism carried by the chuck head is in position to clamp the car wheel to the head. When the chuck mechanism has been moved into position another switch is tripped which causes the chuck mechanism to clamp the car wheel to the chuck head. When the car wheel is fully clamped to the chuck head, the head will advance towards the tool carrying head thereby feeding the car wheel to the tool for the boring operation. Simultaneous with the boring operation the transfer mechanism will be returned to its initial position. After advancing a predetermined amount of travel, as initially selected by the operator, a switch will be tripped which causes the chuck head to be retracted at a rapid rate. When the chuck head has been returned to the workpiece line, a switch will be tripped, stopping the retraction of the head and causing the chuck mechanism to be unclamped. The chuck mechanism when fully released trips another switch which causes the chuck head to be fully retracted to its initial start position to complete a cycle of operation.

When the operator initiates another cycle of operation the transfer mechanism will roll a workpiece from the load position into the work position and simultaneously will roll the finished workpiece out of the work position into a receiving position. The finished workpiece in the receiving position will be removed from the machine, as by gravity or conveyor means, while the machine is operting upon the new workpiece.

The foregoing and other objects of this invention will become more fully apparent from the following detailed description, and may be achieved by the exemplifying apparatus depicted in and further described in detail in connection with the accompanying drawings, in which:

FIG. 3 is an enlarged view of the fixture head, partly in vertical section and partly in side elevation, showing the internal mechanism of the chuck mechanism;

FIG. 4 is a transverse view of the machine tool of FIG. 1 taken along the line 4—4 of FIG. 1, showing the transfer mechanism and the arms thereof for rolling the workpieces into position in the machine and the clamping jaws of the fixture head;

FIG. 6 is a view of the fixture head in left side elevation with parts broken away to show the details of the actuating arms of the chuck jaws;

FIG. 7 is a diagrammatic view illustrating the hydraulic circuit incorporated into the machine tool for automatically controlling the machine tool in a complete cycle of operation.

Figure 8:
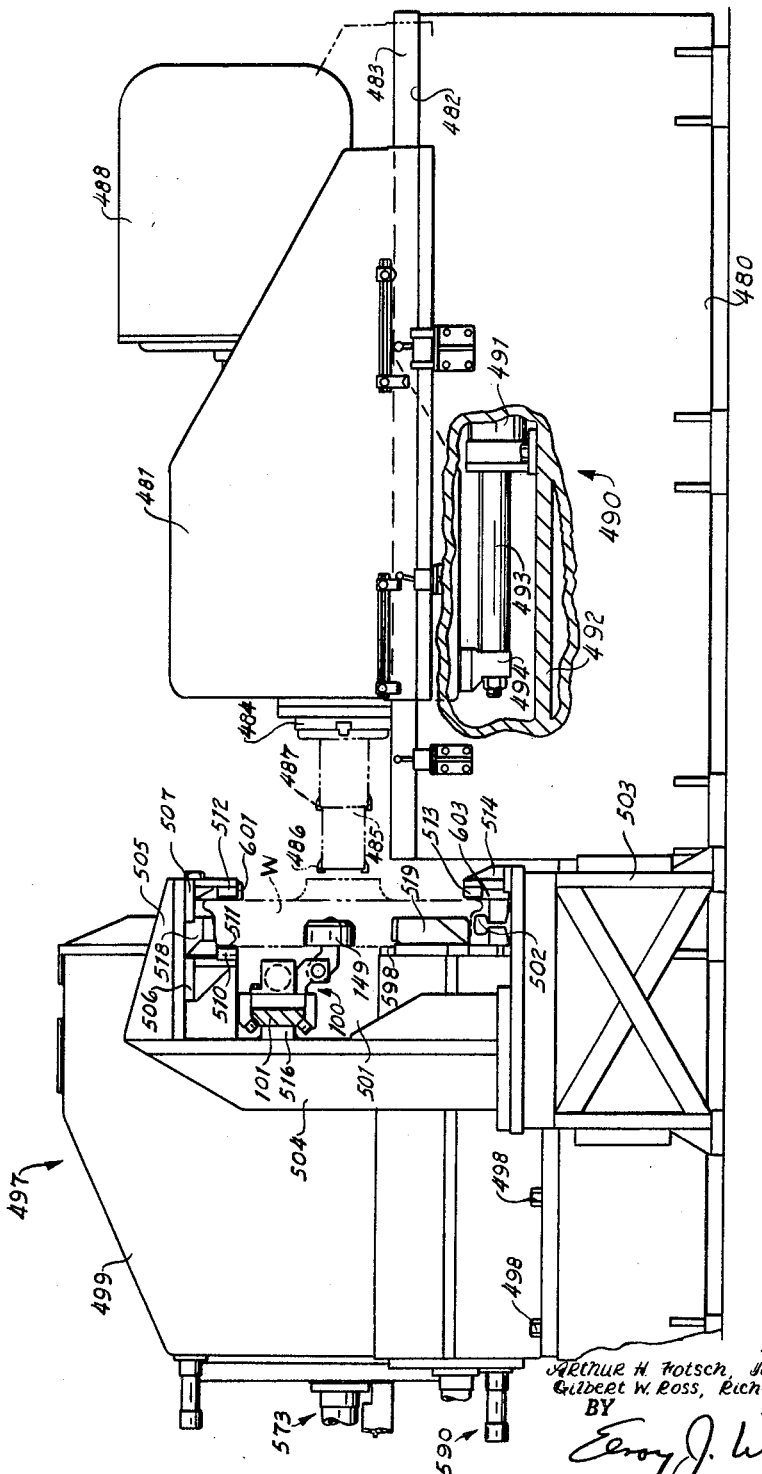
FIG. 8 is a view in front elevation illustrating a modification of the machine tool shown in FIG. 1.
Figure 10:
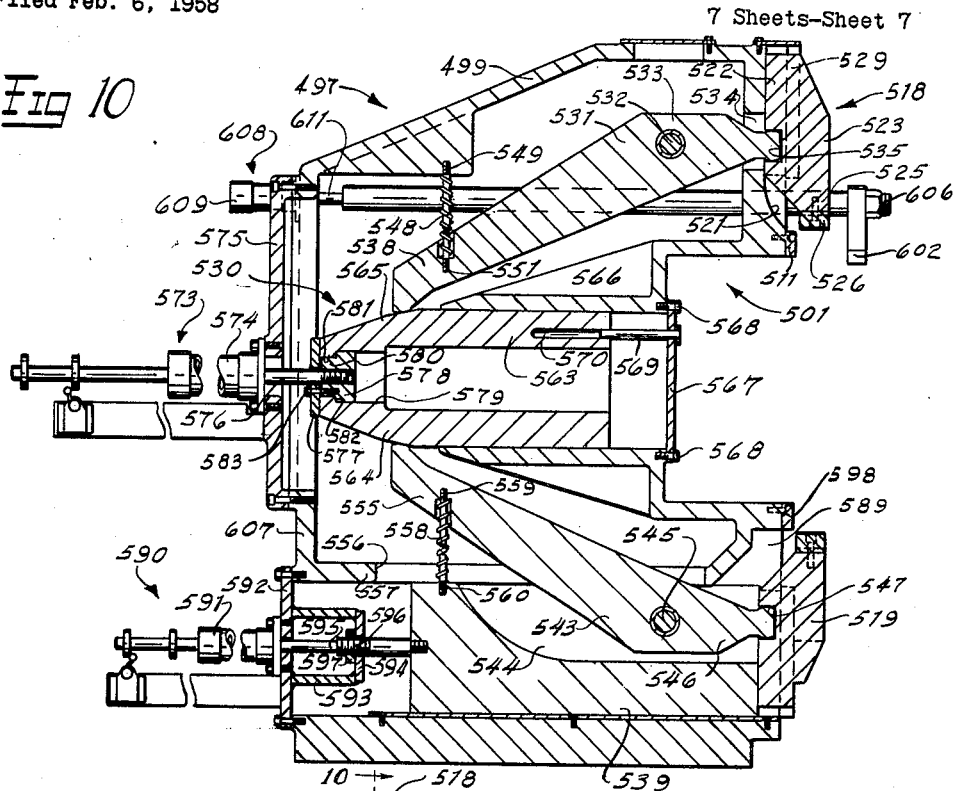
Figure 9:
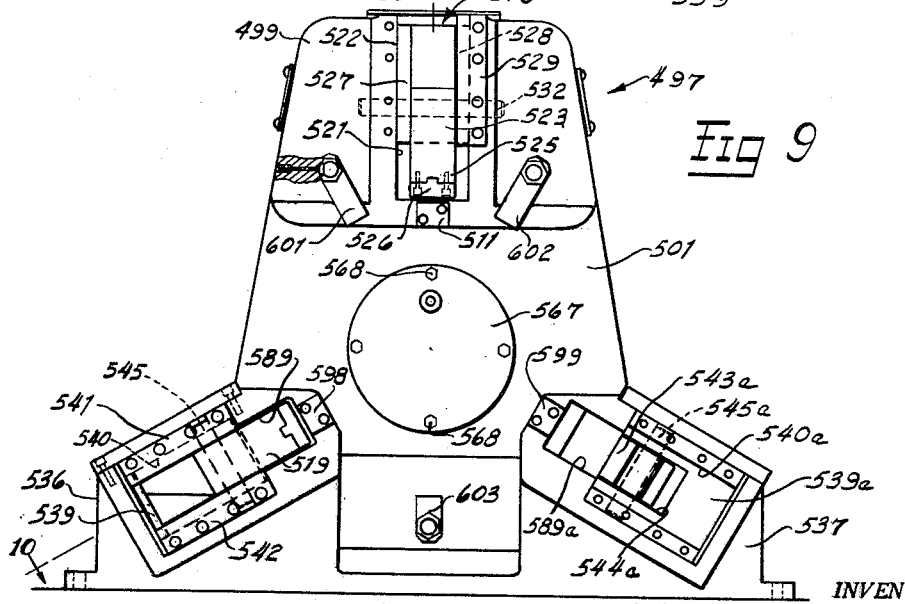

FIG. 9 is an enlarged view in front elevation illustrating the fixture head of the modified machine tool of FIG. 8 to show the arrangement and construction of the clamping jaws and the workpiece locating fingers; and, FIG. 10 is an enlarged view of the fixture head employed in the modified form of the invention, substantially in vertical section taken along the line 10—10 of FIG. 9, with one of the lower jaw assemblies being rotated so as to appear in a vertical plane to more clearly illustrate the operating arrangement for retracting the jaw.

Figure 1:
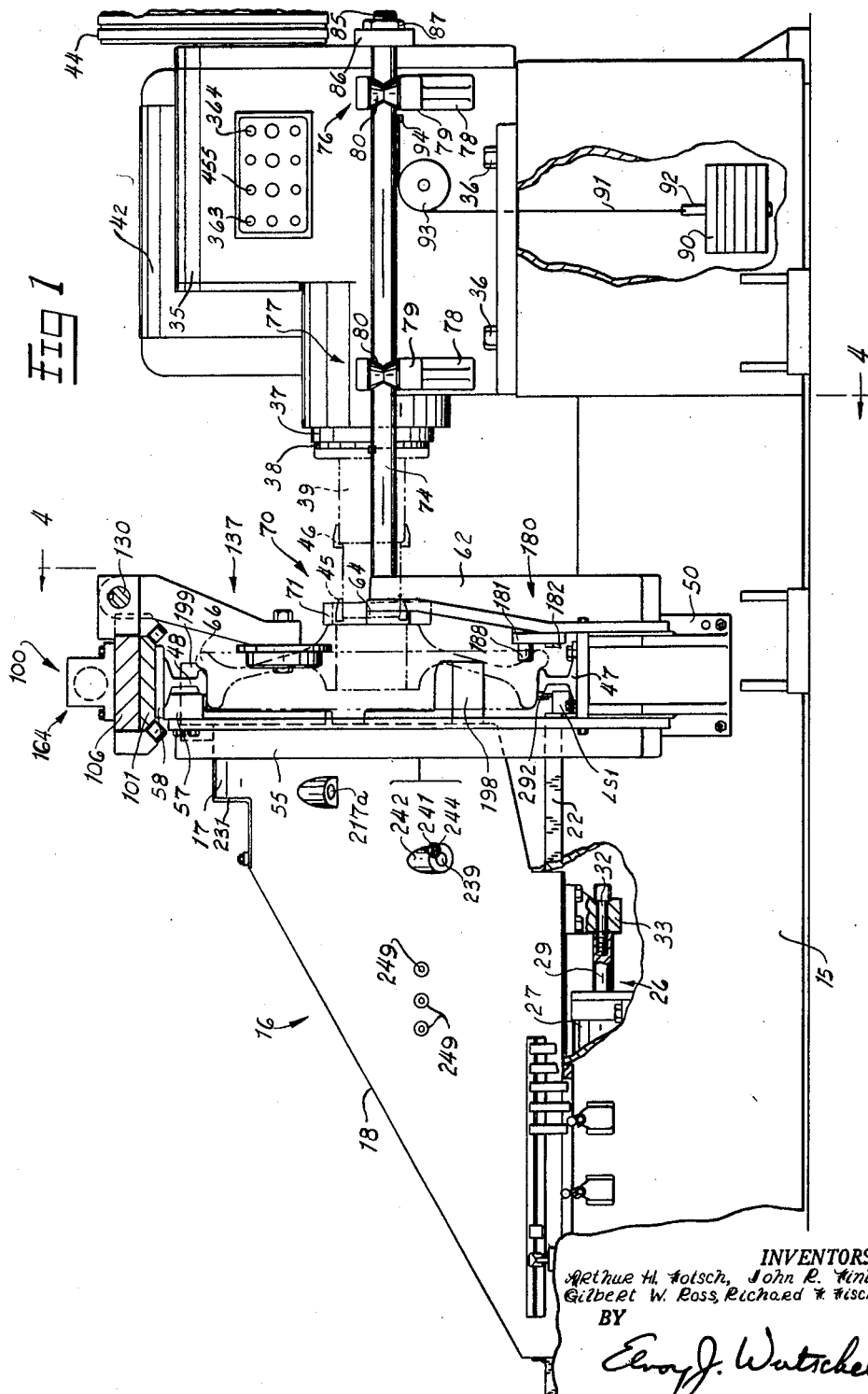
FIGURE 1 is a view in front elevation of a machine tool embodying features of the present invention with parts broken away to show internal mechanism.

Referring more specifically to the drawings and particularly to FIG. 1 thereof, the invention is shown embodied in a horizontal boring machine for boring the axial opening in railroad car wheels while maintaining the wheels in an upright position and comprising, in general, a base 15 on one end of which is supported a chuck or fixture head 16 for longitudinal movement. The fixture head 16, as shown in FIGS. 3 and 6, has an end or face plate 17 and a pair of upstanding sloping side walls 18 and 19 which are integrally formed with the end plate 17 and extend rearwardly thereof. To guide and support the fixture head 16 in its path of travel the base 15 is provided with a pair of integral guideways 22 and 23 which mate with complementary guideways 24 and 25 formed in the fixture head. To actuate the fixture head 16 in its path of travel on the base 15 a fluid actuator, generally identified by the reference numeral 26, is provided.

The fluid actuator 26 comprises a cylinder 27 which is secured to a cross member 28 within the base 15, as shown in FIG. 4. A piston (not shown) is reciprocally supported within the cylinder 27 and is provided with a piston rod 29 which extends outwardly of the cylinder 27. The extending end 32 of the piston rod 29 is secured to a depending bracket 33 which is bolted or otherwise secured to the bottom surface of the head 16.

On the opposite end of the base 15 and facing the fixture head 16 there is provided a spindle head 35 which is fixedly secured to the base by means of bolts 36. The spindle head is provided with a quill 37 in which is rotatably supported a spindle 38. The spindle 38 supports a boring bar 39 for rotation with it and which is secured to the spindle in a well known manner. Power for rotating the spindle 38 is derived from an electric motor 42 which is also secured to the base 15 as by bolts 43, shown in FIG. 2. The electric motor may be of any conventional type and is operably connected to drive the spindle 38 through a conventional belt transmission 44 and a gear transmission (not shown) disposed within the spindle head 35 and operably connected to drive the spindle.

As previously mentioned, the machine tool is operable to perform a boring operation on different size railroad car wheels. In this respect, railroad car wheels are classified in accordance with the gross weight of the cars on which they will be used. Thus, car wheels may be designated as 40 ton, 50 ton or 70 ton wheels. The 40 and 50 ton wheels require a smaller axial opening than do the 70 ton wheels. Therefore, to perform a boring operation on the different size wheels, the boring bar 39 is provided with two sets of cutters having different diameters. As shown in FIG. 1, the boring bar 39 at its extreme outer end is provided with a set of cutters 45 which will be employed to bore the axial opening in car wheels rated at 40 and 50 tons. For the axial opening in car wheels rated at 70 tons, another set of cutters 46 are provided on the boring bar 39 for boring a hole of greater diameter. The set of cutters 46 are spaced rearwardly of the cutter set 45 a sufficient distance so that when the head 16 is advanced to feed a 70 ton car wheel to the set of cutters 46 the set of cutters 45 will pass through the rough axial opening in the car wheel and extend clear of the car wheel before the set of cutters 46 operate upon the car wheel.

It is to be noted that in the particular illustrative machine, the chuck head 16 is described as being movable and the spindle head 35 is described as being fixed so that the chuck head moves towards the spindle head. This relationship of movement between the two head members may be reversed by rendering the spindle head 35 movable and fixing the chuck head 16 to the base 15.

Extending transversely of the base 15, between the fixture head 16 and the spindle head 35, is a pair of workpiece guide and supporting rails 47 and 48. As best shown in FIG. 4, the bottom rail 47 is supported on a pair of laterally extending outriders or frame members 50 and 51. The frame members 50 and 51 are welded or otherwise secured to the sides of the base 15 and extend outwardly from either side of the base 15 a distance sufficient to provide for a load station 52 and a receiving station 53 disposed on either side of the work position or station 54.

Secured to and upstanding from the laterally extending frame members 50 and 51 are a pair of uprights 55 and 56, respectively. Secured to the top of the uprights 55 and 56 is a plurality of horizontally spaced bar members 57 which extend transversely of the base 15 above the fixture head 16. A flat elongated supporting plate 58 is secured to the bar members 57. The top rail 48 is fixedly secured to the bottom surface 59 of the plate 58 above the bottom rail 47. The rails 47 and 48 cooperate to support and guide rollable workpieces, which in this particular instance are railroad car wheels, through the machine.

Another pair of uprights 62 and 63, are rigidly secured to the opposite sides of the laterally extending frame members 50 and 51 respectively, with each of the uprights 62 and 63 being provided with horizontal fence rails 64 and 65 respectively. Thus, a car wheel supplied to the loading station 52 from a source (not shown) is maintained in an upright position between the rails 47 and 48 by the fence rail 64 with the flange portion 66 of the car wheel engaging against the guide rails 47 and 48. The fence rail 65 in the station 53 functions in the same manner as does the fence rail 64 and maintains the car wheel upright when it is rolled or moved from the work station 54 thereto after a work operation has been completed.

To maintain the car wheel in an upright position when in the work station 54, a yieldable backing plate 70 has been provided. The backing plate 70 functions, in one respect, in the same manner as do the fence rails 64 and 65 and it, also, serves to orient the car wheel so that its axis will be parallel to the axis of the boring bar 39. The backing plate 70 comprises an enlarged central car wheel hub engaging portion 71 which is provided with a pair of horizontally extending arms 72 and 73. The arms 72 and 73 extend on either side from the central portion 71 to a point just short of the fence rails 64 and 65, respectively, and are in alignment therewith. Thus, the fence rails 64 and 65 and the backing plate 70 are, in effect, a continuous support for maintaining the car wheels in an upright position while in the machine.

Figure 2:
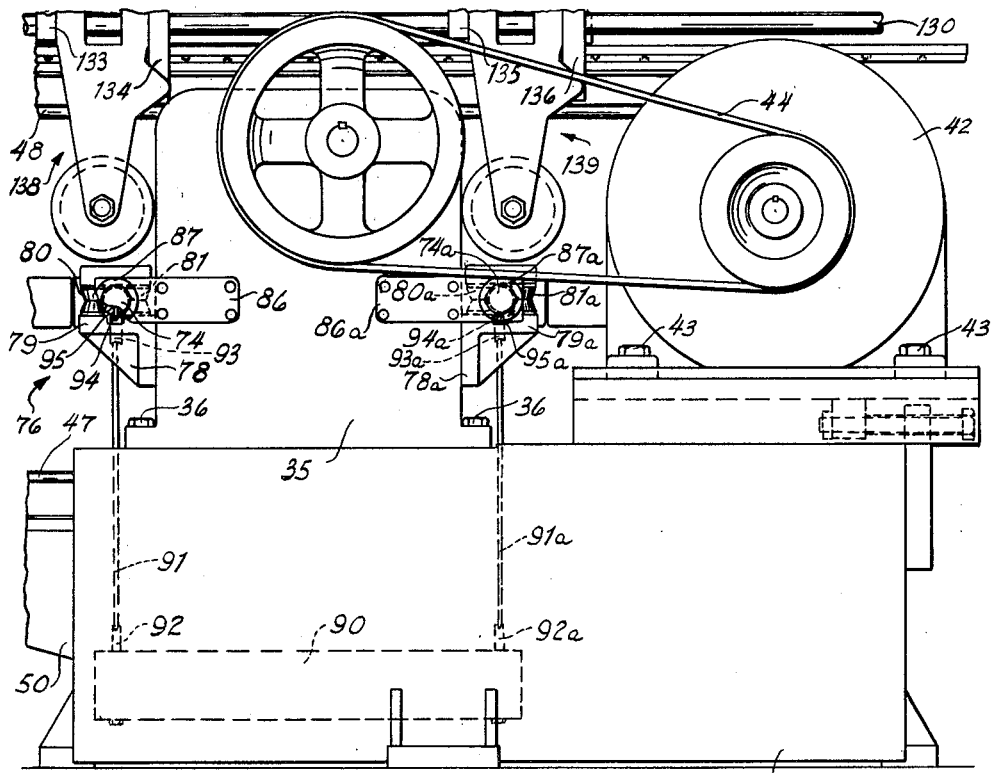
FIG. 2 is a fragmentary view in right side elevation of the machine tool depicted in FIG. 1 showing the tool drive and the arrangement of the backing plate supporting arms.

The backing plate 70 is yieldably supported in position by means of a pair of bar members 74 and 74a. The bar members 74 and 74a shown in FIGS. 1, 2 and 4, are horizontally mounted on either side of the spindle head 35 and are supported thereon for axial movement. Since both bar members are supported on the spindle head 35 in identical manner, the description will be confined to bar member 74 with like reference numerals having a letter suffix given to like parts associated with the bar member 74a.

As shown in FIGS. 1 and 2, the bar member 74 is movably supported on the side of the spindle head 35 in two sets of roller members 76 and 77. Each roller set comprises a bracket 78 which is secured to the side of the head 35 as by welding. The brackets 78 have an outwardly extending supporting arm 79 on which are rotatably supported in spaced apart upright relationship a pair of spool-shaped rollers 80 and 81. The rollers 80 and 81 of each of the sets 76 and 77 serve to movably support and guide the bar member 74 in a horizontal plane with the axis of the bar member being parallel to the axis of the boring bar 39. The backing plate 70 is secured to the end of the bars 74 and 74a in a manner to move the bars.

In order to adjust and limit the forward position of the backing plate 70, in relation to a car wheel in the work station 54, the outer ends of the bars 74 and 74a are threaded as at 85 and 85a and pass through suitable openings in a pair of stop plates 86 and 86a. The stop plates 86 and 86a are bolted or otherwise secured to the back face of the spindle head 35 as shown in FIGS. 1 and 2. A pair of adjustable stop nuts 87 and 87a are threadedly engaged on the threaded ends 85 and 85a of the bars, and engage against the stop plates 86 and 86a, respectively, to limit the forward movement of the bars 74 and 74a. The forward limit of movement of the bars 74 and 74a may be adjusted by simply manipulating the nuts 87 and 87a on the threaded ends of the bars until the desired limit of movement has been attained.

Since the backing plate is constructed to be yieldable, for a purpose to be more fully described, a weight 90 is operably connected to the bars 74 and 74a. The weight 90 insures that the weight of a car wheel against the backing plate 70 will not move the backing plate rearwardly and thereby permit the wheel to fall out of its upright position when in the work station 54. The weight 90 is housed within the interior of the base 15 below the spindle head 35 and is connected to the bars 74 and 74a by means of a pair of cables 91 and 91a which are attached to the weight 90 by bolts 92 and 92a. The cables 91 and 91a are entrained over a pair of pulleys 93 and 93a which are rotatably mounted on either side of the spindle head 35. The opposite ends of the cables 91 and 91a are fastened to lugs 94 and 94a provided on the bars 74 and 74a, respectively. To permit of free passage of the lugs 94 and 94a through the brackets 78 and 78a whenever the bars are moved rearwardly, the arms 79 and 79a of the rear set of brackets are provided with recesses 95 and 95a which permit passage of the lugs. While a particular type of weight has been described, any other type of mechanism may be employed for maintaining the bars 74 and 74a and the backing plate 70 inwardly against the weight of the car wheel, as may be desired. Such other apparatus may be a spring, a fluid apparatus, or the like.

Figure 5:
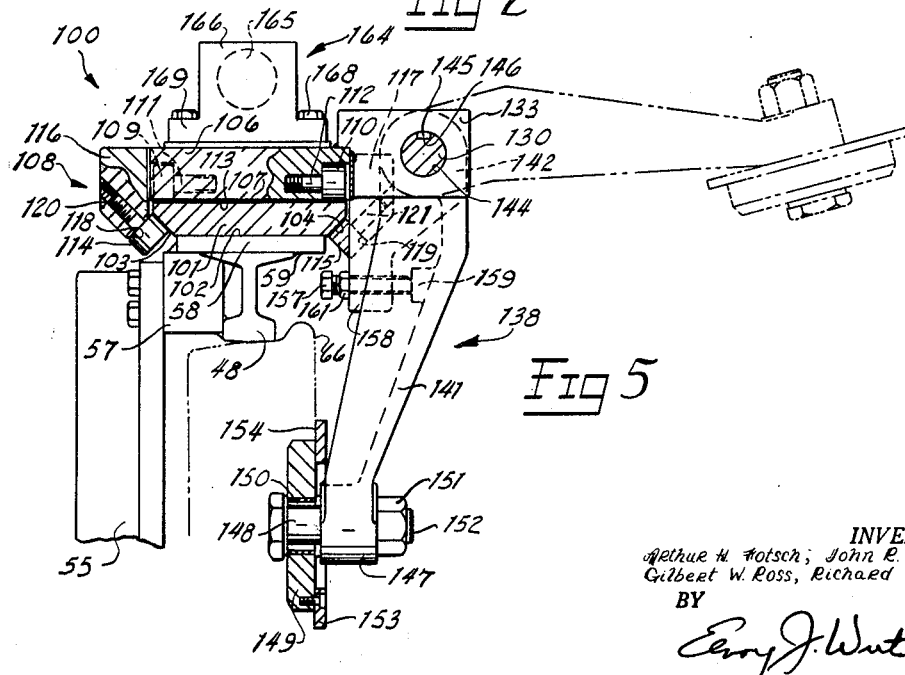
FIG. 5 is an enlarged fragmentary view partly in elevation and partly in vertical section taken along the plane represented by the line 5—5 in FIG. 4 to illustrate the transfer mechanism.

As previously stated, the car wheels supplied to the loading station 52 are rolled or moved into the work station 54 simultaneously with the movement of a finished car wheel out of the work station to the receiving station 53. To this end, a transfer mechanism, generally identified by the reference numeral 100 is provided. The transfer mechanism 100, as best shown in FIGS. 4 and 5, comprises a guide plate 101 which is secured to the top surface 102 of the supporting plate 58, as by welding. The guide plate 101 is provided with beveled side portions 103 and 104 which extend through its entire length. A carrier plate 106 is movably supported on the top surface 107 of the guide plate 101.

To support and guide the carrier plate 106 in its path of travel on the guide plate 101 three sets of supporting and guiding rollers 108, 108a and 108b are employed. The roller sets 108a being disposed at one end of the carrier plate 106, the set 108b being located at the opposite end of the plate, while the set 108 is positioned intermediate the ends of the plate. Each roller set is identical and the description will therefore be directed to the intermediate roller set 108. The roller set 108 comprises a pair of supporting rollers 109 and 110 rotatably mounted on stub shafts 111 and 112, respectively. The shafts 111 and 112 are threadedly engaged in a horizontal plane into the carreir plate 106. The arrangement is such that the peripheries of the rollers 109 and 110 extend slightly below the bottom surface 113 of the carrier plate 106 thereby elevating the carrier plate a slight amount from the supporting plate 101 to afford free rolling travel of the carrier plate on the top surface 107 of the plate 101.

To retain and guide the carrier plate 106 over the supporting plate 101 each set of rollers is provided with side rollers 114 and 115. To support the side rollers 114 and 115 in position a pair of brackets 116 and 117, respectively, are provided. The brackets 116 and 117 are fixedly secured to the sides of the carrier plate 106, as shown in FIG. 5, and are provided with inwardly facing end surfaces 118 and 119. Theadedly engaged into the brackets 116 and 117 and extending outwardly of the surfaces 118 and 119, respectively, are stub shafts 120 and 121 upon which the side rollers 114 and 115 are rotatably mounted. The arrangement is such that the axes of the shafts 120 and 121 are disposed parallel to the bevel surfaces 103 and 104, respectively. The peripheries of the side rollers 114 and 115 engage the bevel surfaces 103 and 104 and roll along these surfaces to retain and guide the carrier plate in position on the supporting plate 101 as it moves on the supporting rollers 109 and 110.

The ends of the guide plate 101 are provided with a pair of end brackets 125 and 126 which are welded or otherwise secured to it. The brackets 125 and 126 each have upstanding end plates 127 and 128 respectively, in which the ends of a relatively long secondary bar 130 are journalled. To rotatably support the secondary bar 130 intermediately of its ends, a plurality of brackets 131, 132, 133, 134, 135 and 136 are provided. The brackets 131 to 136, inclusive, are secured to the side of the carrier plate 106 and move with it, being disposed in spaced apart pairs and function as abutments for enforcing movement in either direction of a plurality of roller arms 137, 138 and 139 mounted on the secondary bar 130.

Since the roller arms 137, 138 and 139 are identical, the description of the arm 138 will be given and will also be applicable to the arms 137 and 139. The roller arm 138, as shown in FIGS. 2, 4 and 5 comprises a body member 141 having a pair of ears or lugs 142 and 143. The lugs 142 and 143 have bored openings 144 which receive the secondary bar 130. Each of the lugs 142 and 143 is provided with an inwardly extending key 145 which mates in a complementary longitudinally extending keyway 146 provided in the secondary bar 130. Thus, the roller arm 138 is maintained in predetermined position on the secondary bar 130 by the brackets 133 and 134 and is movable in either direction along the bar 130 with the carrier plate 106. The roller arm 138, by virtue of its keyed connection to the secondary bar 130, is also pivotable with a rotational movement of the secondary bar 130. The lower end of the body portion 141 of the arm 138 is provided with a hub 147 having an axial opening which receives a bolt shaft 148. Mounted on the bolt shaft 148 is a car wheel flange engaging wheel or roller 149. The wheel or roller 149 is freely supported for rotational movement on the shaft 148, by means of an antifriction bearing 150 carried by the shaft 148. The entire assembly is secured to the arm 138 by a nut 151 threadedly engaged on the threaded end 152 of the bolt shaft 148. The roller 149 is provided with a radially extending flange 153 with its inner surface 154 being operable to engage against the side face of the flange portion 66 of the car wheel.

Each of the roller arms 137, 138 and 139 are provided with positive stops which insure proper positioning of the roller 149 in relation to the car wheels, when the arms are pivotally moved into an engaging position. The positive stops are also effective in preventing the flange 153 of the roller 149, when pivoted into engaging position, from exerting a side force on the car wheels, which force would tend to move the car wheels against the supporting rails 47 and 48 thereby preventing free rolling movement of the car wheels between the rails 47 and 48. The several positive stops are identical in construction so that in the description it will only be necessary to refer to the positive stop associated with the arm 138.

As shown in FIGS. 4 and 5 the positive stop comprises a threaded stud 157 which is threadedly engaged in a depending portion 158 of the bracket 134. The outwardly extending end of the stud 157 is disposed to engage an inwardly extending boss 159 provided on the body portion 141 of the arm 138. The boss 159 is formed on a lug 160 which is integrally formed on the roller arm 138 and extends laterally therefrom. By adjusting the stud 157 inwardly or outwardly of the portion 158 of the bracket 134, the position of the arm 138 with its associated roller 149, may be controlled to establish the desired position of the roller relative to the car wheel. When the stud 157 has been adjusted to establish the desired position of the roller 149 relative to the car wheel, a lock nut 161 threadedly engaged on the stud 157 may be tightened against the bracket portion 158 to lock the stud in place.

To reciprocate the carrier plate 106 and thereby effect reciprocation of the roller arms 137, 138 and 139, there is provided a fluid actuator generally identified by the reference numeral 164. The fluid actuator 164 comprises a cylinder 165 having end mounting plates 166 and 167. The cylinder 165 is secured to the top of the carrier plate 106 by means of threaded studs 168 which are inserted through side flange portions 169 provided on the end mounting plates 166 and 167 and threadedly engaged into the carrier plate 106. A piston (not shown) is reciprocally supported in the cylinder 165 and is provided with a piston rod 170. The piston rod 170 extends outwardly of the cylinder 165 and has its outwardly extending end secured in the end plate 128. Since the end plate 128 is secured to the bracket 126 which in turn is secured to the supporting plate 101, fluid pressure supplied to the cylinder 165 on one side or the other of the piston therein, will cause a movement of the cylinder and the carrier plate 106 to which it is attached. When the carrier plate 106 is reciprocated, the arms 137, 138 and 139 will move with it by reason of their connection thereto through the associated brackets enforcing sliding movement of the arms on the secondary bar 130.

Figure 7:
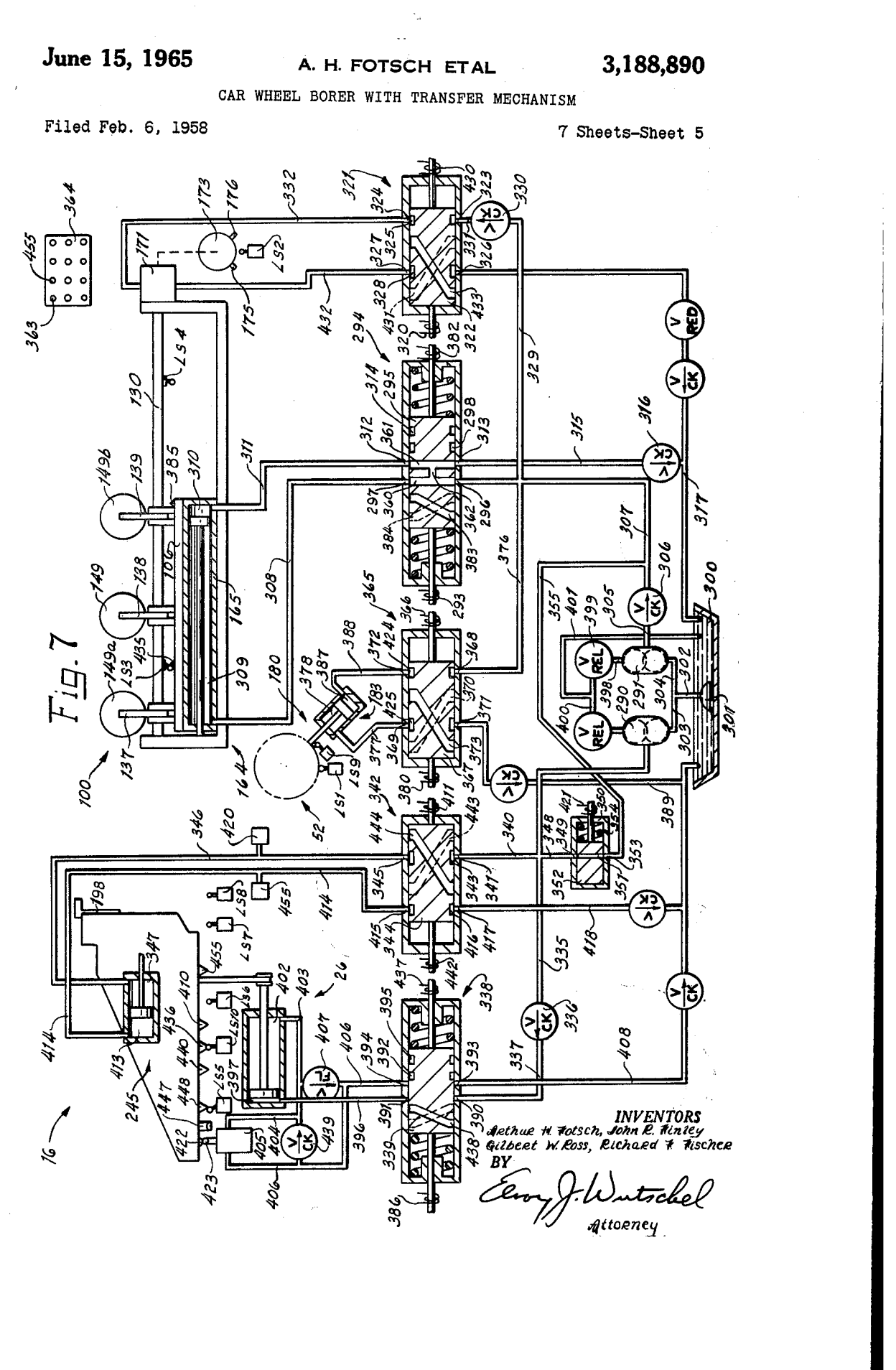

Rotation of the secondary bar 130 to effect pivotal movement of the roller arms 137, 138 and 139 is achieved by actuating a fluid rotary motor 171. The motor 171 is secured to the end plate 128, as shown in FIG. 4, and is operably connected to the end of the secondary bar 130, in a well known manner. The motor 171 is operative in either direction to rotate the secondary bar 130 in a manner that the roller arms are pivotally movable between a disengaged position, represented by the broken lines in FIG. 5, and a car wheel engaging position, shown in full lines in FIG. 5. A limit switch LS2 secured to a mounting bracket 172, which, in turn, is secured to the end plate 128, is operative when actuated in one direction to stop the operation of the motor 171 when the motor has operated to pivot the roller arms into an engaging position. The limit switch LS2 when actuated in the opposite direction will stop operation of the motor 171 when it has been operated to pivot the roller arms into the disengaged position. To actuate the limit switch LS2 in either direction a dog plate 173 is secured to the outer extending end of the shaft 174 of the motor 171. A pair of dogs 175 and 176, which are schematically shown in FIG. 7, are secured in appropriate spaced relationship, on the dog plate 173.

In operation, assuming that the roller arms 137, 138 and 139 are in the disengaged position, the motor 171 is operated to pivot the arms into engaged position. When the motor 171 has operated to move the arms in position, one of the dogs in the dog plate 173 will actuate the limit switch in one direction to stop the motor. Assuming that a car wheel is in the load position 52 and also that a car wheel is in the work position 54, the roller 149a of the arm 137 will engage the periphery of the flange of the car wheel in the loading station 52 behind the car wheel as shown in FIG. 4. The roller 149 of the arm 138 will engage the periphery of the flange of the car wheel in the loading station 52 ahead of the car wheel. The roller 149, also, will engage the periphery of the flange of the car wheel in the work station 54 behind the car wheel. The roller 149b of the arm 139 will engage the periphery of the flange of the car wheel in the loading station 54 ahead of the car wheel and will likewise engage the flange of the car wheel in the receiving station 53.

When the roller arms are in position, fluid pressure may be supplied to the rod end of the piston (not shown) in the cylinder 165 to effect movement of the carrier plate 106 rightwardly as viewed in FIG. 4. Since the secondary bar 130 will remain stationary, movement of the carrier plate 106 will cause a like movement of its associated brackets 131, 133 and 135 which, in turn, will effect movement of the arms 137, 138 and 139, respectively, in the same direction as the carrier plate 106 moves. The roller 149a moving with the arm 137 will cause a car wheel in the loading station 52 to roll between the supporting rails 47 and 48 while the roller 149 on the arm 138 will prevent the car wheel from advancing at rate greater than the rate of advancement of the roller 149a thereby controlling the position of the car wheel relative to the roller 149a. Similarly, the roller 149 of the arm 138 will function to roll the car wheel in the work station 54 out of the work station into the receiving station 53 while the roller 149b of the arm 139 will prevent the car wheel from advancing faster than the rate of advancement of the roller 149. The advancement of the car wheels, therefore, is always controlled and there is no possibility of the car wheel in the load station advancing past the work station 54 or clashing and fouling the next adjacent car wheel. Likewise the car wheel in the work station is under complete control with no possibility of its being inadvertently rolled out of the machine during the advancing movement. Thus, a completely safe and effective mechanism has been provided for advancing a plurality of relatively large and heavy rollable workpieces through a machine tool. The car wheel in the receiving station 53 is not retarded from rolling forwardly inasmuch as the machining operation on it is completed and it may roll into a suitable receptable or conveyor for removal from the machine.

As previously mentioned, the car wheels may be supplied to the loading station 52 of the machine tool as by gravity or by any other desired means. To maintain a car wheel in the loading station 52 after it has been supplied thereto, a gate mechanism, generally identified by the reference numeral 180, is provided. The gate mechanism 180, as shown in FIGS. 1 and 4, comprises an arm 181 which has one end thereof pivotally connected, as at 182, to the upright 62 for movement in a vertical plane. The arm 181 is actuated in the vertical plane by means of a fluid actuator 183. The fluid actuator 183 comprises a cylinder 184 having one end thereof pivotally connected, as at 185, to the side of the outrider structure 50. A piston (not shown) reciprocally supported within the cylinder 184 has a piston rod 186 secured to it. The rod 186 extends outwardly of the cylinder 184 and has its free end pivotally connected, as at 187, to the opposite end of the arm 181.

A laterally inwardly extending lug 188 is integrally formed or otherwise secured to the arm 181 and is positioned so as to extend across the path of travel of a car wheel to thereby engage against the flange of the car wheel, when the arm 181 is in its uppermost position. When the piston and cylinder mechanism 183 is actuated to lower the arm 181 the lug 188 thereon is moved below the level of the supporting surface of the guide rail 47 and out of engagement with the car wheel to thereby permit of movement of the wheel. When the piston (not shown) of the piston and cylinder mechanism 183 is actuated in the opposite direction, the arm 181 is moved upwardly to move the lug 188 into a position where it will be engaged by the flange of a car wheel when a car wheel is supplied to the loading station 52 to limit the forward movement of the car wheel. The arm 181 and the lug 188 thereof, when in the upper position, effectively prevents further rolling advancement of a car wheel. It should be noted that whatever the method of supplying car wheels to the loading station, whether it be by gravity or by any other means, the rate at which the car wheels are rolled into the station will be at a relatively slow rate, and therefore the car wheel upon contacting the lug 188 will be stopped thereby.

The head 16 supports a chuck mechanism, as shown in FIG. 3, and which is generally identified by the reference numeral 192. The chuck mechanism 192 is operable when the head 16 is advanced from the full retracted position, indicated by the broken lines in FIG. 3, to the position that it is shown in, to receive and clamp a car wheel in the work station 54 to the fixture head so that upon further advancement of the head 16 towards the spindle head 35 the car wheel will move with it to be fed to the rotating boring bar 39. To this end, the front face 194 of the end plate 17, as shown in FIGS. 3 and 4 is provided with a plurality of recessed radially extending slideways 195, 196 and 197, which are arranged about a center which is concentric with the axis of the boring bar 39. The slideways 195, 196 and 197 receive and slidably support a plurality of L-shaped slides 198, 199 and 201, respectively.

In FIG. 3 the slideway 195 is shown without its respective L-shaped slide 198 for the purpose of showing the construction of the slideway. The longitudinal edges of the L-shaped slides are recessed to form side flanges 202 and 203 which extend the entire length of and on either side of the portion of the slides within the slideways. To maintain the slides within their respective slideway, a pair of retainer plates 204 and 205 are provided for each slide and are secured to the front face 194 of the head 16 as by studs 206. The retainer plates are disposed on either side of the portion of the slide within the slideway and overlap the side flanges 202 and 203 thereof to retain the slides in their respective slideway. The outwardly extending leg portions 207 of each of the L-shaped slides 198, 199 and 201 are provided with jaws 208 which are formed so as to fit against the contour of the flange and tire of the car wheel. The jaws are secured to the portions 207 by cap screws 209.

As shown in FIG. 4, the slideways are formed in the front face 17 of the head 16 in a manner that the slideways 195 and 197 are disposed equiangularly on either side of a vertical center line through which the axes of the boring bar 39 and the chuck mechanism 192 pass. The sideway 196 is disposed so that its axis coincides with the vertical center line. The arrangement is such that when the L-shaped slides are actuated in a clamping action, the slides 198 and 201 in the slideways 195 and 197 respectively, will cradle the car wheel to prevent any lateral movement of the car wheel and will slightly lift the car wheel off of the rail 47 to center the car wheel in relation to the axis of the boring bar 39. The slide 199 will maintain the car wheel in axial alignment with the axis of the boring bar 39.

In order that the slide 199 may pass forwardly past the top guide rail 48 when the head is moved toward the spindle head 35, the rail is provided with an opening 210. The opening 210 is of sufficient dimension, both in height and width, so that the slide 199 will freely pass through it.

To actuate the slides 198, 199 and 201 in a clamping or releasing movement a novel actuating mechanism 215 is provided. As shown in FIGS. 3 and 6, the actuating mechanism 215 is contained within the head 16 and comprises a plurality of arms 216, 216a and 216b. The arms are identical in construction and arrangement, therefore a description of the arm 216 will apply to all of the arms. The arm 216 is pivotally mounted on a shaft 217 which is mounted in an opening 218 provided in the face plate 17 of the head 16. The opening 218 communicates with the interior of the head 16, extends through the end plate 17, and opens into the slideway 196 provided in the front face 194. Similar openings for the slideways 195 and 197 are provided, and in FIG. 4 the slide for the slideway 195 has been removed and the opening is there identified by the reference numeral 218a. The outwardly extending end of the arm 216 is provided with a ball end 219 which extends into a recess 220 provided in the back face of the slide 199. The arrangement is such that pivotal movement of the arm 216 about the shaft 217 will effect movement of the slide 199 in the slideway 196. The inner or longer end 221 of the arm 216 is provided with an inwardly facing shoe 222 which is adapted to ride upon a cam surface 223 of a cam sleeve 224.

The cam sleeve 224 serves to actuate the arms 216, 216a and 216b and is slidably mounted on a tubular support 225. The support 225 is mounted in a central axial opening 226 provided in the end or face plate 17 of the head 16. The opening 226 is disposed so that its axis coincides with the axis of the boring bar 39. To prevent rotation of the cam sleeve 224 on the tubular support 225 and thereby prevent misalignment of the cam surfaces relative to the associated arms, the cam sleeve 224 is provided with a longitudinal keyway 227 which slidably receives a key 228 carried by the tubular support 225.

Likewise, the tubular support 225 is prevented from rotating within the opening 226 by means of a locking rod or shaft 235, shown in FIG. 4. The rod 235 is inserted in a bore 236 provided in the end plate 17 which extends angularly upwards to communicate with a suitable recess provided in the tubular support 225. The locking rod 235 is maintained in place within the bore 236 by a screw plug 238. The locking rod 235 not only serves to prevent rotation of the tubular member 225 within the opening 226 but, also, insures that the tubular member will not move axially.

The end 221 of the arm 216 is urged radially inwardly to maintain it in engagement with its respective cam surface to thereby insure positive positioning of the slide when in an unclamped position. To this end, a compression spring 230 is mounted in a bracket 231 which is bolted to the end plate 17, as shown in FIG. 3. A stud 229 is threadedly engaged in a boss 232, provided on an extending leg 233 of the bracket 231, and abuts the end of the spring housed within the boss 232. The opposite end of the spring 230 is seated in a recess provided in the top surface of the arm 216. By adjusting the stud 229 inwardly the force that the spring 230 will exert upon the end 221 of the arm 216 may be increased, or by adjusting the stud 229 outwardly the force may be decreased. A jam nut 234 threadedly engaged on the stud 229 serves to lock the stud in an adjusted position.

A resilient arrangement is also provided for maintaining the arms 216a and 216b in engagement with the cam operating member 224. The structure provided for resiliently urging the ends of the arms 216a and 216b are identical and therefore a description of the arrangement for the arm 216a will be given, which description will also apply to the arrangement for the arm 216b. As shown in FIG. 6, an upwardly sloping bore 237 is provided in the wall 18 within which a tube 267 is press fitted and extends inwardly toward the ends of the arm 216a. A compression spring 243 is inserted within the tube 267 and has its inner end seated in a recess 268 in the end of the arm 216a. A rod 239 is movably contained within the tube 267 in abutting engagement with the outer end of the spring 243 within the tube 267. The rod 239 is of suffiicent length so that when it is fully inserted within the tube 267 it will act to preload the spring 243 to a degree that the spring 243 will urge the end of the arm 216a radially inwardly so that its shoe 222b will be maintained in constant engagement with a cam surface 240 provided on the cam sleeve 224. The rod 239 is maintained within the tube 267 by means of a retaining washer 241 which is maintained in place by a screw 244 threaded into the surface of a boss 242 provided on the wall 18. As previously mentioned, the end of the arm 216b is similarly maintained in engagement with its associated cam surface 256 on the cam sleeve 224, as is the arm 216a.

To actuate the arms 216, 216a and 216b a fluid reciprocating motor 245 is provided and is carried by the head 16. To this end, as shown in FIGS. 3 and 6, a mounting plate 246 is supported on carrier lugs or shelves 247 and 248 integrally formed on the inner surfaces of the walls 18 and 19, respectively. The mounting plate 246 is secured on the lugs 247 and 248 by bolts 249 which are inserted through suitable openings provided in the sides of the walls 18 and 19 into threaded engagement with the sides of the plate 246. The reciprocating motor 245 is mounted on the plate 246 and includes a reciprocating rod 250 which extends from the right end of the motor 245 as viewed in FIG. 3 and is disposed so that its axis is concentric with the common axis about which the slides 198, 199 and 201 are radially movable. The outer extending end of the rod 250 is threaded as at 251 and is threadedly engaged in a manifold plate 252.

The manifold plate 252 is provided with an annular flange 253 which seats against an inwardly extending annular flange 254 provided on the end of the cam sleeve 224. The manifold plate 252 is provided with a radially extending recess 255 which serves as a fluid connecting passage for coolant to be supplied to the boring bar 39. A plate 258 is seated against the outer face of the annular flange 254 and has a central opening 259 through which a nipple portion 260 of the manifold plate 252 extends. The plate 258 is secured to the manifold plate 252 as by bolts 261 thereby effectively locking both the manifold plate 252 and the plate 258 on either side of the annular flange 254 in a manner to effect a hydrualic seal and form a chamber therebetween. A threaded opening 265 provided in the plate 258 receives a threaded end of a coolant supply pipe 266 which is connected to a flexible conduit (not shown) which, in turn, is connected to the coolant supply source (not shown). The manifold plate 252 is also provided with a threaded opening 270 which receives the threaded end of a coolant discharge pipe 271. The chamber 262 formed by the recess 255 and the plate 258 serves as a connecting passage between the two pipes 266 and 271.

A baffle plate or sealing plate 272 is mounted around the discharge pipe 271, being secured to the end of the tubular support 225 and serves to prevent coolant discharge from the pipe 271 from flowing rearwardly toward the manifold plate 252. The tubular support 225 is provided at its outer end with an enlarged recess 275 which has a diameter somewhat greater than the diameter of the forward cutters 45 on the boring bar 39. The recess 275 serves to receive the extending end of the boring bar 39 and the cutters 45 thereon when the chuck head 16 is actuated to advance a car wheel to the cutters 46. The tubular support 225 is also provided with an opening 278 which, as shown in FIG. 3, is positioned at the bottom of the support and which is in communication with an opening 279 provided in the end plate 17 of the head 16. The openings 278 and 279 serves as a chip passage for the material removed by the boring bar when operating upon the car wheel.

In operation, when the head 16 is advanced from its fully retracted position, indicated by the broken lines in FIG. 3 to the position adjacent the car wheel in the work station 54, the reciprocating motor 245 is actuated to effect movement of the rod 250 leftwardly, as viewed in FIG. 3. Movement of the rod 250 leftwardly will effect leftward movement of the cam sleeve 224. Upon leftward movement of the cam sleeve 224 the ends of the arms 216, 216a and 216b riding upon their respective cam surfaces 223, 240 and 244 will be moved radially outwardly pivoting the arms on their respective pivot shafts 217, 217a and 217b. The outer ends of the arms 216, 216a and 216b connected to their associated slides will move the slides radially inwardly to force the jaws 208 into engagement with the periphery of the car wheel. The bottom slides 198 and 201 in moving inwardly will cradle the car wheel between them and lift and center the car wheel so that its axis will coincide with the axis of the boring bar 39. The slide 199 will move inwardly down on the car wheel and the three slides will thereupon coact to securely hold the car wheel in an axial aligned position.

The head 16, upon being moved to the car wheel engaging position, will act to orientate the car wheel by moving it slightly outwardly again the car wheel hub engaging portion 71 of the backing plate 70. Since the backing plate 70 is maintained in its forward position by the associated weight 90, the car wheel will be urged against vertical locating pads 280 provided on each of the slides 198, 199 and 201. This action insures that the car wheel will be in a vertical position so that the slides 198, 199 and 201 of the chuck mechanism 192 will position and hold the car wheel in true axial alignment with the axis of the boring bar 39. Thus, there is no possibility of the car wheel being misaligned in respect to the boring bar 39 as by being canted when the slides engage the periphery of the car wheel.

In the unclamping action, the reciprocating motor 245 is actuated to effect movement of the rod 250 outwardly or rightwardly, as viewed in FIG. 3. Rightward movement of the rod 250 will effect movement of the cam sleeve 224 to the right to release the pressure exerted by the cam surfaces on the ends of the associated arms so that the cam contacting ends of the arms under the pressure of their cooperating springs will be urged inwardly to effect movement of the slides 198, 199 and 201 radially outwardly. The bottom slides 198 and 201, in which the car wheel is cradled, upon being moved in a release direction, will lower the car wheel to the supporting rail 47 so that the car wheel is again in position to be advanced or rolled into the receiving station 53.

The action of the clamp mechanism 215, and movements of the clamp head 16 and transfer mechanism 100 as well as rotation of the secondary bar member 130 are the result of hydraulic pressure being applied to the various hydraulic cylinders which actuate the movements. The various limit switches employed to effect sequential operation of the various electromagnetically operated valves employed in the hydraulic circuit are diagrammatically shown in FIG. 7. However, the electrical circuit used in conjunction with the limit switches and electromagnetically operated valves has not been shown, as the circuit as such, forms no part of the present invention. The oil pressure in the hydraulic circuit is maintained by means of two pumps 290 and 291 constantly driven by an electric motor (not shown).

It will be assumed that the machine tool is initially conditioned so that the transfer mechanism 100 is fully retracted leftwardly, as shown in FIG. 4, and the roller arms 137, 138 and 139 are raised to a disengaged position, with the chuck head 16 fully retracted and the gate mechanism 180 in a raised or workpiece stop position, as shown in FIG. 4, and with a finished workpiece W1 in the work station 54. A workpiece W2, which in this particular instance is assumed to be a 40 ton railroad car wheel, is supplied to the loading station 52, as by gravity. The car wheel or workpiece W2, upon rolling into the loading station 52 will depress a limit switch LS1, shown in FIGS. 1 and 4, as secured to the outrider 50 in position so that a plunger 292 thereof will be depressed by the car wheel W2 when in the loading station 52. The limit switch LS1, when depressed, closed an electrical circuit to energize a solenoid 293 of a hydraulic circuit unloading valve 294 to move a spring centered plunger 295 in the valve leftwardly to connect a pressure inlet port 296 thereof to a port 297 via a cannelure 298 provided in the plunger 295.

Thereupon, oil is drawn from an oil reservoir 300 through an oil filter 301 and intake pipes 302, 303 and 304 into the pumps 290 and 291 from where the fluid is pumped into the circuit under pressure. The fluid flows from the pump 291 into an oil line 305 and through a connected check valve 306 into a pressure supply line 307 into the port 296 of the valve 294. From the inlet port 296 fluid under pressure will flow through the valve 294 via the cannelure 298 and out through the port 297 into an oil line 308 and thence into a chamber 309 of the fluid actuator 164 of the transfer mechanism 100 on the rod side of the piston thereof to insure that the transfer mechanism is in a fully retracted position. A chamber 310 in the actuator 164 on the head side of the piston thereof is vented to the reservoir 300 via a line 311 connected to a port 312 provided in the valve 294. With the plunger 295 of the valve 294 positioned to the left as previously stated, the port 312 is connected to a fluid outlet port 313 in the valve 294 via a cannelure 314 i nthe plunger 295. The port 313 is connected to the reservoir 300 by an oil line 315, a check valve 316 and an oil return line 317.

The limit switch LS1, upon being depressed, is also electrically connected to energize a solenoid 320 of a solenoid valve 321. The solenoid 320, upon being energized, operates to position a plunger 322 therein leftwardly, thereby connecting an inlet port 323 to a port 324 of the valve via a cannelure 325 provided in the plunger and also connects an exhaust port 326 with a port 327 via another cannelure 328 in the plunger 322. Thereupon, oil in the pressure supply line 307 will flow into a branch line 329 and through a check valve 330 and a line 331 into the inlet port 323 of the valve 321. Oil under pressure will continue to flow through the valve 321 via the cannelure 325 and out through the port 324 into a line 332 connected to one side of the fluid motor 171 to rotate the arms 137, 138 and 139 into workpiece engagement.

Simultaneously with the operation of the pump 291 the pump 290 is operating to pump fluid under pressure into a supply line 335 and is directed thereby through a check valve 336 into an oil line 337 and flows therein to a solenoid valve 338. A plunger 339 is spring centered within the valve 338 and in this position serves to block fluid from passing through the valve. Thus the head 16 is hydraulically locked in a fully retracted position.

A branch oil line 340 connected to the supply line 335 and to an inlet port 341 of a solenoid valve 342 receives fluid from the supply line 335. Fluid flowing to the inlet port 341 of the valve 342 passes through the valve via a cannelure 343 provided in a plunger 344 within the valve and flows out through a port 345 into an oil line 346. The line 346 is connected to a chamber 347 on the rod end of the piston therein of the chuck actuator 245. Since the chuck mechanism 192 is unclamped, the fluid pressure flowing from the line 346 into the chamber 347 will serve to maintain the chuck mechanism unclamped. Excess fluid in the supply line 335 will flow into another branch line 348 connected to a port 349 of a blocking valve 350. Fluid entering the port 349 of the valve 350 will pass through a passage 351 provided in a movable plunger 352 within the valve and flow out through a port 353. As shown in FIG. 7, the passage 351 is normally maintained in alignment with the ports 349 and 353 through the action of a spring 354 contained within the valve and acting upon the plunger 352 to position the plunger so as to maintain the passage 351 in alignment with the ports 349 and 353. Fluid flowing through the valve 350 will enter an oil line 355, which is connected into the supply line 307, and combine with the fluid supplied by the pump 291. The combined fluid output will actuate the motor 171 in a counterclockwise direction thereby rotating the secondary bar 130 to pivot the arms 137, 138 and 139 into workpiece engagement. The dog plate 173 connected to the fluid motor 171 will rotate in a counterclockwise direction and the dog 175 thereon will actuate the limit switch LS2 in a clockwise direction, as viewed in FIG. 7, at the time that the arms 137, 138 and 139 engage the workpieces.

The limit switch LS2, upon being actuated in a clockwise direction, will interrupt the electrical circuit to the solenoid 320 of the valve 321 and to the solenoid 293 of the unloading valve 294. When the solenoid 293 of the valve 294 is de-energized the plunger 295 thereof will be resiliently centered, to connect ports 296 and 297 together via a passage 360, and ports 312 and 313 together, via a passage 361 provided in the plunger 295. The passages 360 and 361 are interconnected by a passage 362 which functions to unload the hydraulic circuit, returning fluid supplied by the pumps 290 and 291 to the reservoir 300.

To start a machining cycle for a 40 ton car wheel, the operator actuates a cycle start switch 363 disposed in a control panel 364. The control panel 364 is mounted on the side of the spindle head 35 in position to afford an operator, stationed at the panel, a clear view of the operation of the machine tool. The cycle start switch 363, when depressed, establishes an electrical circuit to the solenoid 293 of the unloading valve 294 to energize the solenoid and to effect movement of the plunger 295 leftwardly to pressurize the system, as previously described. The cycle start switch when depressed, also, establishes an electrical circuit to actuate a solenoid valve 365 by energizing a solenoid 366 to move a plunger 367 rightwardly and thereby connect an inlet port 368 with a port 369 by means of a passage 370 provided in the plunger. Movement of the plunger 367 to a rightward position will also connect a port 371 and a port 372 together through another passage 373 provided in the plunger 367.

Thereupon, the combined fluid from the pumps 290 and 291, flowing in the fluid supply line 307 will flow into a branch line 376 and enter the port 368 of the valve 365 and pass therethrough via the now aligned connecting passage 370 in the plunger 367 and out through the port 369 to the fluid actuator 183 of the gate mechanism via a line 377. Oil flowing in the line 377 is directed into a chamber 378 at the rod side of the piston of the actuator 183 to effect a lowering of the gate mechanism 180 out of its car wheel stop position to free the car wheel for an advancing movement. When the actuator 183 operates to lower the gate 180, fluid in a chamber 387 on the head side of the piston of the actuator 183 is forced out into a line 388 and flows through the solenoid valve 365 via the port 372, the passage 373 and the port 371 to return to the reservoir 300 via a return line 389 and the line 408.

When the gate mechanism is lowered, a limit switch LS9, shown in FIG. 4 as secured to the upright 62 adjacent the lower rail 47, is contacted by the arm 181 to interrupt the electrical circuit to the solenoid 293 of the valve 294 and to the solenoid 366 of the valve 365 to de-energize the solenoids. Thereupon, the plunger 295 of the valve 294 will be spring returned to a centered position, while the plunger 367 of the valve 365 will remain as presently positioned but will be conditioned for subsequent leftward movement upon energization of a solenoid 380 connected thereto.

The depressed limit switch LS9 also establishes an electrical circuit to a solenoid 382 of the valve 294 and to the solenoid 320 of the valve 321 to energize the solenoids. Since the plunger 322 of the valve 321 is positioned in a leftward position through a previous energization of the solenoid 320 the present re-energization of the solenoid 320 serves to insure positive retention of the plunger 322 of the valve in the leftward position so that fluid pressure will be supplied to the motor 171 to maintain the arms 137, 138 and 139 in workpiece engagement.

Energization of the solenoid 382 of the valve 294 will effect a movement of the plunger 295 therein to a rightward position whereby ports 296 and 312 are connected together through a passage 383 and ports 313 and 297 are connected together through a passage 384 provided in the plunger 295. Fluid pressure in the line 307 will now enter port 296 of the valve 294 and by means of the connecting passage 383 will pass through the valve and flow out through the port 312 into the oil line 311. Fluid will then flow into the chamber 310 of the transfer mechanism actuator 164 to move it axially effecting a rolling advancement of the car wheels to their succeeding stations, as previously described.

At the end of the advancement movement, a limit switch LS4 is actuated by means of a rod 385, shown in FIG. 4 as being mounted on the bracket 136. The limit switch LS4 is shown as being secured to the top surface of the end bracket 128. The limit switch LS4, upon being actuated, will interrupt the electrical circuit to the solenoid 320 of the valve 321 to de-energize it. The limit switch LS4 is also connected to establish an electrical circuit to energize a solenoid 386 of the solenoid valve 338 to move the plunger 339 therein to a leftwardly position. In the leftward position the plunger 339 operates to connect a fluid inlet port 390 having the fluid line 337 connected thereto, to a port 391 by means of a cannelure 392 provided in the plunger 339. Also, a port 393 and a port 394 of the valve 338 are connected together by means of another cannelure 395.

Upon the positioning of the plunger 339 of the valve 338 into the leftward position, fluid supplied by the pump 290 to the port 396 will flow through the valve 338 via the port 390, the cannelure 392 and the port 391, into a connected oil line 396 to a chamber 397 of the head actuator 26. This demand on the pump 290 will effect a drop in pressure in the oil line 355. Since the demand on the pump 291 has been met, the pump would normally unload through a line 398, a relief valve 399, a line 400, and a reservoir return line 401. However, due to the drop in pressure in the line 355, excess fluid from the pump 291 will flow from the line 307 into the line 355 from where it will pass through the open valve 350 into the line 348 to the line 335 to combine with the oil from the pump 290. The combined oil from the two pumps 290 and 291 will then be delivered under pressure to the chamber 397 of the actuator 26, as previously described, to advance the chuck head 16 at a rapid rate.

Fluid in a chamber 402 on the rod side of the piston of the actuator 26 will be forced out of the chamber into a line 403 and will flow through the line into a line 404. From the line 404 fluid will flow through a valve 405 into a line 406 and pass through the solenoid valve 338 via the port 394, the cannelure 395 in the plunger 339, and the port 393 to return to the reservoir 300 via a return line 408.

When the chuck head 16 has been moved to a position adjacent the car wheel in the work station 54, a dog 410 adjustably secured on the side of the head 16, as shown in FIG. 3, will actuate a limit switch LS6 mounted on the side of the frame 15 in position to be engaged by the dog 410. Actuation of the limit switch LS6 functions to effect a stoppage of the advancement of the chuck head 16. In this respect, the limit switch LS6, when actuated, interrupts the electrical circuit to the solenoid 386 of the valve 338 thereby de-energizing the solenoid to permit the plunger 339 thereof to be biased to a centered position thereby blocking the flow of fluid under pressure to the actuator 26.

The limit switch LS6, when actuated, will also establish an electrical circuit for energizing a solenoid 411 to effect movement of the plunger 344 of the valve 342 to a rightward position, as shown in FIG. 7. With the plunger in the rightward position, fluid pressure in the line 335 will flow therefrom to the inlet port 341 of the valve 342 via a line 340. Fluid will flow through the valve via the cannelure 343 in the plunger 344 thereof and flow out through the port 345 to the chamber 347 of the chuck actuator 245 via the line 346. Fluid pressure flowing to the chamber 347 of the actuator 245 will effect a movement of the slides 198, 199 and 201 in a clamping action for clamping the car wheel to the chuck head 16 as described.

Fluid in a chamber 413 of the actuator 245 on the head side of the piston therein will be forced out into a line 414 and flow through the solenoid valve 342 via a port 415, a cannelure 416 in the plunger 344, and a port 417 to return to the reservoir 300 via a return line 418 and the line 408.

When the car wheel is fully clamped in the chuck 192, the pressure in the line 346 will build up whereupon a pressure switch 420, connected into the line 346, will be actuated. When the pressure switch 420 is actuated the condition of the valves 350, 338, 321 and 365 will be effected simultaneously. In this respect, a solenoid 421 of the valve 350 will be energized to move the plunger 352 therein and move the passage 351 out of alignment with the ports 349 and 353 thereby blocking the flow of fluid through the valve. The closing of the valve 350 will divide the hydraulic circuit into two separate systems, the one having the pump 290 to serve the head actuators 26 and the clamp actuator 245; and the other in which the pump 291 serves the gate actuator 183, the transfer actuator 164 and the fluid motor 171. In this manner, the speed advantage of two volume combination pump may be utilized when advancing or retracting the head 16 at a rapid rate and the advantage of the single pump systems in maintaining constant pressure may be employed when advancing at a feed rate. Thus, when an actuator served by the pump 291 is moved, there will be no drop in pressure in the feed actuator 26 or the clamp actuator 245 since these have now been divided into separate systems.

In addition, the solenoid 386 of the valve 338 will be again energized to direct fluid pressure from the pump 290 to the chamber 397 of the head actuator 26 to advance the head. As the head 16 starts to advance, a dog 422 adjustably secured to the side of the head 16, as shown in FIG. 3, engages a plunger 423 of the valve 405 to effect a blocking of an opening within the valve. Thus, the flow of exhaust fluid from the chamber 402 of the actuator 26 through the valve 405 is blocked and the fluid exhaust will be forced back to the reservoir over a flow control valve 407 connected between the line 403 and 406. Thereafter the advancement of the head 16 will be at a feed rate as determined by the setting of the flow control valve 407.

The pressure switch 420 will also energize the solenoid 380 of the valve 365 to move the plunger thereof to a leftward position. In the leftward position the inlet port 368 and the port 372 are connected together by means of a cannelure 424 provided in the plunger. Thereupon, fluid pressure in the line 376 will flow through the valve 365 via the port 368, the cannelure 424 and the port 372 and be directed to the chamber 387 on the head side of the piston of the gate actuator 183 by means of the oil line 388. Fluid pressure in the chamber 387 of the gate actuator 183 will move the gate mechanism 180 into a blocking position so that the loading station 52 is now conditioned to receive a new workpiece or car wheel. As the actuator 183 operates to position the gate mechanism into a blocking position, fluid in the chamber 378 is forced out of the chamber into the line 377 and will flow through the valve 365 via the port 369, a cannelure 425 provided in the plunger 367 of the valve 365 and the port 371 to return to the reservoir 300 via the lines 389 and 408.

As the head 16 is advanced to feed the car wheel to the tool 39 in a work operation, the transfer mechanism 100 will be reconditioned or reset for another cycle of operation. The resetting of the transfer mechanism 100, during the machining or work operation will effect a reduction in the overall time that a complete cycle of operation takes, thereby the production rate of the machine tool is materially increased.

Thus, simultaneously with the energization of the solenoids 421, 386 and 380, the pressure switch 420 will also establish an electrical circuit to a solenoid 430 of the valve 321 to energize the solenoid and move the plunger 322 thereof to a rightward position. Thereupon fluid pressure in the line 329 will flow through the valve via the inlet port 323, a passage 431 in the plunger 322 of the valve and the port 327 into an oil line 432 connected to the opposite side of the fluid motor 171. Fluid pressure supplied to the opposite side of the motor 171 will effect a clockwise movement of the motor to rotate the secondary bar 130 and pivot the arms 137, 138 and 139 out of engagement with the car wheels and into a raised position. At this time fluid exhausting from the motor 171 will flow into the line 332 and enter the valve 321 through the port 324. The exhaust fluid will pass through the valve via another passage 433 provided in the plunger 322 of the valve and out through the port 326 and return to the reservoir 300 via the return line 317.

When the motor 171 has operated to raise the arms 137, 138 and 139, the dog 176 on the dog plate 173 will contact the limit switch LS2 and actuate it in a counterclockwise direction. The limit switch when actuated in the counterclockwise direction functions to interrupt the electrical circuit to the solenoid 382 of the valve 294 to de-energize the solenoid. The solenoid 382 having been previously energized when the gate mechanism 180 was lowered and depressed the limit switch LS9. When the solenoid 382 is de-energized the plunger 295 of the valve is spring returned to its center position.

Simultaneously with the de-energization of the solenoid 382 the limit switch LS2 also functions to establish an electrical circuit to the solenoid 293 of the valve 294 to energize the solenoid and move the plunger 295 into a leftward position. With the plunger 295 of the valve 294 in a leftward position, fluid pressure from the pressure supply line 307 will flow through the valve via the inlet port 296, the cannelure 298 and the port 297. From the port 297 fluid pressure is directed into the chamber 309 of the transfer actuator 164 by the oil line 308. Fluid pressure supplied to the chamber 309 will effect a retraction of the transfer mechanism to its start position, thereby releasing the limit switch LS4 which will spring return to its normal condition. The transfer mechanism is now reset for another cycle of operation. As the actuator 164 operates to retract the transfer mechanism 100, fluid in the chamber 310 will be exhausted therefrom into the line 311. From the line 311 the exhaust fluid will enter the valve through the port 312 and be directed through the valve by the cannelure 314 and will flow out through the port 313. From the port 313 the exhaust fluid will flow into the line 315 and return to the reservoir 300 via the check valve 316 and the return line 317.

When the transfer mechanism has been fully retracted, a limit switch LS3, shown in FIG. 4 as secured to the end plate 127, is actuated into an open condition by a rod 435 carried in the movable plate 106. The limit switch LS3 is of the type that is normally closed and maintained in the closed position by spring pressure. The limit switch LS3, upon being actuated to an open condition, interrupts the electrical circuits to the solenoid 430 of the valve 321, the solenoid 380 of the valve 365 and to the solenoid 293 of the valve 294 to thereby unload the pump 291 through the valve 294, as previously described, and, also, to condition the valves 294, 365 and 321 for a subsequent cycle of operation.

During the time that the transfer mechanism 100 is being retracted and the valves of the system served by the pump 291 are being reconditioned for a subsequent cycle of operation, the pump 290 is continuing to supply fluid pressure to the head actuator 26 to feed the car wheel to the boring bar 39 in a work operation. This action will continue until the dog 436, shown in FIG. 3 as being adjustably mounted on the side of the head 26, contacts a limit switch LS7. The limit switch LS7 is mounted on the base 15 in position to be engaged by its associated dog 436 upon completion of the machining operation. When the limit switch LS7 is actuated, the electrical circuit to the solenoid 421 of the blocking valve 350 is interrupted, thereby de-energizing the solenoid to permit the return of the plunger 352 therein to its normal open condition. With the valve 350 in its normally open condition the hydraulic systems served by the pumps 290 and 291 are again interconnected through the line 348, the valve 350 and the line 355, as previously described.

Simultaneously with the de-energization of the solenoid 421, the limit switch LS7 functions to establish an electrical circuit to the solenoid 293 of the valve 294 to energize the solenoid to once again move the plunger 295 thereof to a leftward position to pressurize the system, as previously described. Also, the limit switch LS7 interrupts the electrical circuit to the solenoid 386 of the valve 338 to de-energize the solenoid and permit the plunger 339 thereof to be spring returned to its normal or centered position. Simultaneously with the de-energization of the solenoid 386 of the valve 338, an electrical circuit is established to a solenoid 437 of the valve 338 to energize the solenoid and effect a movement of the plunger 339 of the valve to a rightward position. The plunger 339, when in a rightward position, functions to connect the pressure line 337 to the line 406 via the inlet port 390, a passage 438 in the plunger 339 and the port 394. Thereupon, the combined fluid pressure in the line 337 will flow through the valve 338 via the port 390, the passage 438 and the port 394 into the line 406. Since the valve 405 has been previously actuated closed upon the advancement of the head 16, the fluid pressure in the line 406 will build up and flow through a check valve 439 into the line 403 and be directed thereby into the chamber 402 of the actuator 26 to retract the head 16.

The head 16 will be retracted at a rapid rate until the car wheel, held in the chuck mechanism 100, is positioned over the guide rail 47, as shown in FIG. 3. When the head 16 has been retracted to this position a dog 440 adjustably mounted on the side of the head 16, as shown in FIG. 3, actuates a limit switch LS10. The limit switch LS10 is carried on the side of the base 15 in position to be engaged by the dog 440. The limit switch LS10, upon being actuated, functions to interrupt the electrical circuit to the solenoid 437 of the valve 338, de-energizing the solenoid to permit the return of the plunger 339 to its center block position, thereby stopping retraction of the head 16. The limit switch LS10 also functions to interrupt the electrical circuit to the solenoid 411 of the chuck valve 342 to de-energize it and, simultaneously, establish an electrical circuit to a solenoid 442 of the same chuck valve 342 to energize it and effect a movement of the plunger 344 thereof into a leftward position. Thereupon fluid pressure in the line 340 will flow through the valve 342 via the inlet port 341, a passage 443 and the port 415 into the line 414. Fluid pressure in the line 414 will be directed thereby to the chamber 413 of the chuck actuator 245 to effect unclamping of the car wheel and replacement of the car wheel on the rail 47. During the unclamping action fluid in the chamber 347 of the actuator 245 will exhaust into the line 346 and flow through the valve 342 via the port 345, a passage 444 in the plunger 344, and the port 417 to return to the reservoir 300 via the lines 418 and 408. The pressure drop in the line 346 will effect a resetting of the pressure switch 420 for subsequent operation.

When the chuck mechanism 192 is fully unclamped, the pressure in the line 414 will built up and actuate a pressure switch 455, connected into the line 414. The pressure switch 455, upon being actuated, functions to interrupt the electrical circuit to the solenoid 442 of the chuck valve 342 to de-energize the solenoid and condition the valve for another cycle of operation. The pressure switch will again establish an electrical circuit to the solenoid 437 of the valve 338 to energize the solenoid to reposition the plunger 339 into a rightward position thereby directing fluid pressure to the chamber 402 of the head actuator 26 to fully retract the head to its initial position, indicated by the broken lines in FIG. 3. As the head 16 is moved to a full retracted position, a dog 447, shown in FIG. 3 as being adjustably mounted on the side of the head 16, engages the plunger 423 of the valve 405 to lift the plunger thereby opening the valve to recondition it for the next cycle of operation and to by-pass the hydraulic pressure being directed to the actuator 26 for retracting the head 16.

When the head 16 has been fully retracted, a dog 448, adjustably secured to the side of the head 16, as shown in FIG. 3, actuates a limit switch LS5. The limit switch LS5 is mounted on the frame 15 in position to be engaged by the dog 448. The limit switch LS5, when actuated, with interrupt the electrical circuits to the solenoids 293 and 437 of the valves 294 and 338, respectively. The solenoid 437, upon being de-energized, will permit the return of the plunger 339 of the valve to its central blocking position and will be conditioned for the next cycle of operation. De-energization of the solenoid 293 will permit the plunger 295 of the valve 294 to return to its central position, thereby unloading both pumps through the passage 362 as previously described.

As previously stated, the machine tool is designed to accommodate different size car wheels and the operation has been described as including the actuation of a cycle start switch 363 to initiate an automatic cycle of operation in conjunction with a 40 ton car wheel. However, if the car wheel to be operated upon is of a larger size, necessitationg the feeding of the car wheel to the cutters 46 of the boring bar 39, the operator would actuate another cycle start switch 455 in the control panel 364 which simply renders the limit switch LS7 inoperative upon being contacted by the dog 436. The head 16 carrying the car wheel would then be advanced until the cutters 46 completed a work operation on the wheel, at which time a dog 455, shown in FIG. 3 as adjustably mounted on the side of the head 16, would actuate a limit switch LS8. The limit switch LS8 is mounted on the side of the frame 15 in position to be engaged by the dog 455. The limit switch LS8, when actuated, is arranged to function exactly as does the limit switch LS7. It is therefore deemed unnecessary to describe the functions occurring upon actuation of the limit switch LS8, as the description given in conjunction with the limit switch LS7 will apply.

The control panel 364 accommodates various other electrical switches which are normally incorporated in a control panel associated with a machine tool as well as having various indicating lights to show completion of functional sequences.

In a modified form of the invention, as shown in FIGS. 8, 9 and 10, there is provided a horizontal boring machine having a hollow base 480 on one end of which is supported a spindle head 481 for horizontal movement. The top surface 482 of the base 480 is provided with a pair of guideways 483, one of which is shown, in guiding engagement with complementary guideways formed in the spindle head 481 in a well known manner. The spindle head 481 is provided with a horizontally disposed rotatable spindle 484 in which a boring bar 485 is secured for rotation therewith. The boring bar 485 is similar to the boring bar 39, shown in FIG. 1. The boring bar 485 is provided with a first or forwardly located set of cutters 486 and a second or rearwardly set of cutters 487. The sets of cutters are arranged for performing a boring operation of different diameters, thus, constituting operational zones for performing selective operation on railroad car wheels of different rate load sizes in the manner previously described for the construction illustrated in FIG. 1.

Power for driving the spindle 484 is derived from an electric motor 488 secured to the spindle head 481 and operably connected to drive the spindle 484 through a gear transmission (not shown) operably contained within the spindle head 481 in a well known manner.

The spindle head 481 is moved along the guideways 483 by means of a fluid motor 490 comprising a cylinder 491 which is secured to a horizontal platform 492 integrally formed within the hollow base 480. A piston (not shown) is reciprocally supported within the cylinder 491 and is provided with a piston rod 493, the outwardly extending end of which is connected to a depending bracket 494. The bracket 494 is welded or otherwise secured to the bottom surface of the spindle head 481 and is arranged so as to extend downwardly into the interior of the hollow base 480 between the ways 483.

On the opposite end of the base 480 and facing the spindle head 481 there is provided a fixture head 497 which is fixedly secured to the base by stud bolts 498. The fixture head 497 comprises a hollow frame 499 the front face of which is provided with transverse recess or passage 501 which serves to receive the forward end of the boring bar 485 whenever the spindle head 481 is advanced to employ the rearwardly set of cutters 487 in a work operation. The recess 501 also accommodates the transfer mechanism 100 which operates to roll car wheels in a controlled rolling movement, into and out of the work position, as previously described.

Extending transversely of the base 480 and located between the spindle head 481 and the fixture head 497 is a car wheel guide rail 502 which is supported on the top surfaces of laterally extending side members 503. The side members 503 are table like structures which are secured to the sides of the base 480 and extend outwardly thereof from either side. Upstanding from the side members 503 are a plurality of supports 504, one of which is shown in FIG. 8. Each of the upstanding support members 504 are provided with an extending arm 505 to the under side of which is secured a pair of depending brackets 506 and 507. A fence rail 510 is secured to each bracket 506 and extends from the outermost end of each of the side members to a point short of a vertical line which passes through the axis of the fixture head. Thus, the fence rail 510 extends inwardly from either side of the machine to the center thereof wherein a gap or space is provided. Extending outwardly from the face of the fixture head 497 into the space provided in the fence rail 510 and secured to the face of the fixture head is a car wheel locating pad 511, shown in FIGS. 8, 9 and 10, which is employed to orientate a car wheel in a vertical plane.

Similarly, another fence rail 512 is secured to the brackets 507 so that it is spaced from the rail 510 and disposed parallel to it. The fence rails 510 and 512 cooperate to prevent the top of a car wheel, supported on the guide rail 502, from moving out of the upright position during the period that the car wheels are in the loading station or unloading station and while the car wheel is being advanced in a rolling movement.

To maintain and prevent the bottom of the car wheel from being displaced off of the guide rail 502 there is provided a lower fence rail 513. The lower fence rail is secured to a plurality of brackets 514, one of which is shown in FIG. 8, which are secured to the top surface of the side members 503. The lower fence rail 513 likewise extends transversely of the base 480 from the outermost ends of the side members 503. Thus, a car wheel supplied to the guide rail 502 is maintained thereon in an upright condition by the fence rails 510, 512 and 513.

As previously stated, the transfer mechanism 100 is located within the recess 501. To this end, the fixed guide plate 101 is welded to mounting blocks 516 which in turn are welded to the upstanding supports 504. The rollers 149 and the roller arms thereof are positionable into a car wheel engaging position, as shown in FIG. 8, or to a disengaged position below the transfer mechanism 100. The operation of the transfer mechanism is the same as previously described for the machine depicted in FIG. 1.

In the modified example of the machine tool, the fixture head 497 is constructed so as to be maintained in a fixed position on the base 480. Thus, the fixture head 497 must be operable to receive and position the car wheel in axial alignment with the boring bar 485, and must also be arranged so as to provide a clear path of travel for a car wheel as it is moved along the guide rail 502. To this end, the fixture head 497 is provided with three clamping elements or jaws comprising a top or vertical jaw 518 and a pair of bottom or cradling jaws 519. In the interest of clearly showing the manner in which the jaws 519 are arranged for radial movement the lower right hand one of a pair of jaws 519, as viewed in FIG. 9, has been omitted, while the left hand one of the pair is shown in position. Furthermore, in order to clarify the illustration, the lower left hand jaw shown in FIG. 9 is depicted as being in a vertical plane in FIG. 10 although it is to be understood that the jaw is angularly displaced from the vertical plane, as shown in FIG. 9. Since both of the lower jaws are of identical construction the description will be limited to a single one thereof.

As shown in FIGS. 9 and 10, the upper jaw 518 comprises a guide portion 522 which is supported for guided movement in a guideway 521 provided in the front face of the top overhanging portion of the housing 499. Integrally formed with the guide portion 522 and disposed perpendicularly thereto so as to extend outwardly from the face of the housing 499 is a body portion 523. The body portion 523 is elongated and extends beyond the guide portion 522 in a manner to provide a nose portion 525 to which is secured a jaw pad 526. The body portion 523 of the jaw 518 is constructed so as to be narrower than the guide portion 522, thereby forming elongated shoulder surfaces 527 and 528. To maintain the jaw 518 within the guideway channel 521, a pair of retainer plates 529, one of which is shown in FIG. 9, are secured to the face of the housing 499 on either side of the guideway channel 521 in a manner to overlap the shoulders 527 and 528 formed by the outer surface of the guide portion 522 and the perpendicular body portion 523.

An actuating lever 531 for moving the jaw 518 in its path of travel is pivotally mounted on a shaft 532 which is supported in a pair of spaced web members (not shown) formed within the interior of the housing 499. The lever 531 is provided with a short arm portion 533 the end of which extends outwardly of the housing 499 through an opening 534 provided in the face of the extending or overhanging portion. The outwardly extending end of the arm portion 533 is engaged within a recess 535 formed in the guide portion of the jaw 518 and is operably connected to effect movement of the jaw 518 downwardly or upwardly upon pivotal movement of the lever 531 about the shaft 532.

The opposite arm or long end 538 of the actuating lever 531 extends inwardly towards the common axis to engage an operating cam member 530. The long arm 538 is maintained in engagement with the operating member 530 by a spring 548 which is maintained in position by rods 549 and 551 which are threadedly engaged in the housing 497 and the arm 538, respectively.

The lower jaws 519 are arranged similar to the upper jaw 518 for radial movement about the common axis but are also arranged so as to be retractable within the interior of the fixture head 497 to provide a clear path for movement of a car wheel into or out of the position adjacent the fixture head 497. To this end, the fixture head 497 is provided with elongated angularly disposed side housings 536 and 537 in which are supported for axial movement, slide blocks 539 and 539a. As previously stated, the construction and operation of the lower pair of jaw members 519 and also the associated slide blocks 539 and 539a, are identical therefore the following description will apply to both.

The slide block 539 is slidably supported within the angularly disposed side housing 536 for axial movement. The forward or outer face of the slide block 539 is provided with a guideway channel 540 which is similar to the channel 521. Within the channel 540 a jaw clamp or jaw member 519 is slidably supported for movement along a line which passes through the common axis. The jaw 519 is maintained within the guideway channel 540 by a pair of retainer plates 541 and 542. The construction of the lower jaws and of the associated guideway channel are the same as described above for the upper jaw 518. As shown in FIG. 10, an actuating lever 543 is pivotally mounted in an elongated axial opening 544 provided in the slide block 539, on a shaft 545 mounted in the slide block transversely of the opening 544. A short arm portion 546 of the actuating lever 543 extends outwardly of the face of the slide block 539 into a recess 547 provided in the jaw 519. The arrangement is such that pivotal movement of the lever 543 will effect a movement of the jaw 519. The opposite end or long arm portion 555 extends through an elongated opening 556 provided in an interior web portion 557. The web portion 557 functions as a wall of the housing in which the slide block 539 is mounted. The extending end of the arm 555 is disposed to engage the operating cam member 530 and is maintained in engagement therewith by a spring 558. The spring 558 is maintained in operative position by means of a pair of rods 559 and 560. The rod 559 is threadedly engaged in the arm portion 555 and the rod 560 is threadedly engaged in the slide block 539 in opposing relationship to the rod 559.

The operating member 530 comprises a tubular member 563 having a frusto-conical end portion 564, the peripheral surface 565 of which constitutes a cam surface on which the ends of the actuating levers engage. The tubular operating member 530 is slidably supported within a bore 566 formed in the housing 497 for axial movement. The operating member 530 is arranged so that its axis coincides with the common axis about which the jaw members are radially movable. A cap plate 567 is provided to cover the outer open end of the bore 566 and is secured in place by a plurality of screws 568. The cap plate functions to prevent chips, dirt and the like from entering into the bore 566. A rod 569, secured to the cap plate 567, extends inwardly and engages in an elongated opening 570 provided in the operating member 530 and functions to prevent rotation of the operating member 530 in the bore 566.

The cam member 530 is movable axially by means of a fluid actuator 573 comprising a cylinder 574 which is secured to a back plate 575 that is fastened to the end of the housing 499. A piston (not shown) reciprocally supported within the cylinder 574 is provided with a piston rod 576 that extends inwardly through the backing plate 575 and through a bored opening in a back plate 577 of the cam member 530. The free end of the piston rod 576 is provided with a threaded portion which is threadedly engaged in a nut 578 contained within a reduced bore portion 579 provided in the operating member 530. The nut 578 is provided with a boss 580 which snugly fits within a reduced opening 581 provided in the end of the operating member. Thus, the nut 578 engages against a circular flange 582 formed by the reduced opening 581. A plurality of screws 583 are inserted through suitable openings in the back plate 577 into threaded engagement with the nut 578 and effectively lock the back plate 577 and the nut 578 to the operating member 530. The back plate 577 and the nut 578 constitute an operable connection whereby the fluid actuator 573 may impart reciprocal motion to the operating member 530.

A fluid motor 590 is employed to reciprocate the slide block 539 and comprises a cylinder 591 which is secured to a closure plate 592. The closure plate 592 functions to seal the end opening of the housing in which the slide block 539 is contained. The inner surface of the closure plate 592 is provided with a hollow hub member 593 having a cap plate 594. A piston (not shown), reciprocally supported within the cylinder 591 is provided with a piston rod 595 which extends inwardly through suitable axially aligned openings in the plate 592 and the cap plate 594. The free end of the rod 595 is provided with a threaded portion which is threadedly engaged in a suitable threaded opening in the end of the slide block 539. The rod 595, adjacent to the opening in the cap plate 594, is provided with a threaded section 596 on which an adjusting nut 597 is threadedly engaged. By adjusting the nut 597 on the threaded portion 596 of the rod 595, forward or outward movement of the slide block 539 may be limited so that the fluid actuator may move the block 539 only a distance sufficient to position the jaw member 519 outwardly of the face of the fixture head 497 and into the plane in which the jaw member 518 is located. A similar actuating arrangement is provided for the slide block 539a. While individual actuators have been employed for each slide block, it is apparent that both slide blocks may be connected together by means of a yoke bar connected to the actuating rods and a single actuator then could be employed for moving both of the slide blocks.

The slide block 539, when actuated in a retracting movement, will operate to move the actuating lever 543 with it as well as the jaw member 519. The jaw member 519 will then be recessed within an opening 589 provided in the front face of the angular side portion 536. Thus, the jaw member 519 is moved to provide a clear path for movement of a car wheel into the fixture head 497. Since both of the lower jaw members operate in the same manner, a clear egress path is also provided for movement of a car wheel out of the fixture head.

As shown in FIG. 9, a pair of locating pads 598 and 599, are secured to the faces of the angular side housings above the jaw members. The three locating pads 511, 598 and 599 function to orientate a car wheel in a vertical plane to insure that the axis of the car wheel, when in the work position, will be parallel to the axis of the boring bar 485. To locate a car wheel against the pads 511, 598 and 599 a plurality of fingers 601, 602 and 603 are provided. The fingers 601, 602 and 603 operate to engage the car wheel and move it bodily so that the face of the car wheel adjacent the fixture head 497 will engage against the locating pads. The fingers 601, 602 and 603 are identical and therefore a description of one will apply to all.

As shown in FIG. 10, the finger 602 is secured to the extending end of an actuating rod 606 which extends through a suitable opening (not shown) provided in the fence rail 512 and which is sufficiently large to permit of movement of the finger 602 therethrough. The rod 606 is slidably supported in the housing 499 and extends therein to a rear wall 607 thereof. A fluid actuator 608 is provided for actuating the rod 606 to effect engagement and disengagement of the finger 602 with the car wheel. The fluid actuator 608 comprises a cylinder 609 which is secured to the outer face of the rear wall 607. A piston (not shown) is reciprocally supported within the cylinder 609 and is provided with a piston rod 611. The piston rod 611 extends inwardly through a suitable opening in the rear wall 607 and is operably connected to the rod 606. The fingers are actuated in a locating action with sufficient force to bring the car wheel into engagement with the pads 601, 602 and 603, but are not operable to effect a clamping of the wheel thereto.

In operation, assuming that the lower jaw members are in a retracted position and the boring head is retracted, the transfer mechanism 109 will be actuated to pivot the rollers 149 into position to engage car wheels in the loading station and in the work station, and will then be actuated to advance the car wheels along the guide rail 502 so that a finished wheel in the work station is moved out of the station and a new wheel is moved from the loading station into the work station. The rollers 149 of the transfer mechanism 100 will then be pivoted into a retracted position and the transfer mechanism reset for another cycle of operation.

After the transfer mechanism 100 has been reset, the slide blocks 539 and 539a are advanced to move the jaw members thereof into position wherein they may be engaged with the car wheel. Simultaneously with the advancement of the slide blocks 539 and 539a, the fingers 601, 602 and 603 are actuated to locate the car wheel against the locating pads 511, 598 and 599. This insures that the axis of the car wheel will be disposed in a plane parallel to the axis of the boring bar 585. When the car wheel has been orientated, the operating cam member 530 will be actuated rearwardly, to the position shown in FIG. 10, causing the actuating levers 539, 543 and 543a to pivot about their respective shafts. This pivotal movement effects radial movement of the jaw members inwardly to effect a clamping of the wheel to the fixture head 497.

The lower pair of jaw members 519 act to cradle the car wheel and to slightly raise or elevate the car wheel off of the guide rail 502. This action brings the axis of the car wheel in alignment with the axis of the boring bar 485. The tool head 481 is then advanced to feed the rotating boring bar to the car wheel. Assuming that the car wheel in the fixture head 497 is of a size wherein the cutters 487 are to be employed, the head 481 is advanced until these cutters have completed a work operation. Thus, the forward cutters 486 will be moved through the wheel and extend into the recess or passage 501 to permit the cutters 487 to operate on the car wheel. Upon completion of the work operation, the tool head 481 will be retracted to move the boring bar clear of the car wheel.

Thereafter, the operating cam member 530 will be moved in the opposite direction and the actuating arms 531, 543 and 543a will be pivotally moved in the opposite direction by action of the springs associated with the individual arms. This will effect radial movement of the jaw members outwardly to release the car wheel. When the car wheel has been released, the finger members 601, 602 and 603 are moved outwardly, out of engagement with the wheel. Simultaneously therewith the slide blocks 539 and 539a will be retracted moving the associated jaw members inwardly into the housing 499 thereby clearing a path for subsequent movement of the car wheel out of the fixture head and a new car wheel into the fixture head.

From the foregoing detailed description of the structure and operation of the illustrative embodiment of the present invention, it will be apparent that an improved production type machine tool has been provided which is especially adapted to automatically position a railroad car wheel in a work orientated position, and operable to receive and hold the car wheel in axial alignment with a work performing tool for a work operation, and is further operable to move the car wheel out of the work position after completion of a work operation thereon while simultaneously moving another car wheel into the work position.

Although the illustrative embodiment of the invention has been described in considerable detail for the purpose of making a full disclosure of a practical operative structure, it is to be understood that the various novel features of the invention may be incorporated in other structural forms without departing from the spirit and scope of the invention, as defined in the subjoined claims.

The principles of this invention having now been fully explained in connection with the foregoing description, we hereby claim as our invention:

1. In a machine tool for performing a work operation upon a circular workpiece; a base; a tool head supported on said base; a cutter rotatably supported in said tool head; a work fixture mounted on said base; said tool head and said work fixture being constructed and arranged so as to provide for relative movement therebetween; a workpiece guide secured to said base and disposed between said tool head and said work fixture transversely of said base in position to rotatably guide a workpiece into a predetermined work position between said tool head and said work fixture; a transfer mechanism carried by said base and operable to roll a workpiece into the work position and a finished workpiece out of the work position simultaneously; a chuck mechanism carried by said work fixture and operable to receive and clamp a workpiece in the work position to said work fixture; a backing plate yieldably carried by said tool head forwardly thereof and being operatively disposed to cooperate with said transfer mechanism and said chuck mechanism in a manner to support a workpiece when in the work position in an upright position and operable to maintain the workpiece therein; and power means operably connected to effect relative movement between said tool head and said work fixture to effect a work operation on said workpiece.

2. In a machine tool; a base; a tool head fixedly mounted on said base; a cutter rotatably carried by said tool head; first power means carried by said base and operably connected to rotate said cutter; a fixture head movably supported on said base for movement toward or away from said tool head; a plurality of stations on said base comprising a loading station, a work station and a receiving station; guide means carried by said base and extending transversely thereof through said stations between said tool head and said fixture head; a transfer mechanism movably supported by said base and operably disposed to move a workpiece from said loading station to said work station and a workpiece from said work station to said receiving station; a chuck mechanism in said fixture head operable to engage and hold a workpiece in a desired position relative to said cutter; second power means connected to actuate said chuck mechanism; third power means connected to move said fixture head into position to cause engagement of said chuck mechanism with a workpiece in said work station for securing the workpiece to said fixture head, said third power means being further operable to move said fixture head toward said tool head to feed the workpiece held in said chuck mechanism in a work operation to said cutter; whereby a workpiece in said loading station may be advanced to said work station and the fixture head may be advanced to engage the chuck mechanism with the workpiece to securely hold the workpiece to the fixture head and thereafter the fixture head may be advanced to feed the workpiece to the rotating cutter in said tool head for a work operation.

3. In a machine tool for performing a work operation on a circular workpiece; a base; a tool head supported on said base; a cutter rotatably supported in said tool head; a motor mounted on said base and operably connected to rotate said cutter; a work fixture mounted on said base for reciprocal movement toward or away from said tool head; guide means carried by said base transversely thereof and disposed between said tool head and said work fixture to rotatably guide the workpiece into a work position between said tool head and said work fixture; a transfer mechanism movably supported by said base in position to roll the workpiece along said guide means into the work position in a controlled movement; a yieldable backing plate carried by said tool head forwardly thereof in position to support the workpiece in an upright position on said guide means in the work position; said backing plate being disposed to cooperate with said transfer mechanism during a transfer movement; a first power means connected to advance said work fixture toward said tool head to a position adjacent the workpiece; a chuck mechanism carried by said work fixture and operable when actuated to receive and clamp a workpiece to said work fixture; said chuck mechanism being operatively disposed to cooperate with said backing plate; a second power means carried by said work fixture operably connected to actuate said chuck mechanism; said first power means being also operable to advance the work fixture and the workpiece thereon toward said tool head to feed the workpiece to said cutter in a work operation; said backing plate yielding upon the advancement of said work fixture to permit of the feeding advancement of the workpiece to said cutter.

4. In a machine tool for performing a work operation upon a circular workpiece; a base; a tool head supported on said base; a tool rotatably supported in said tool head; a fixture head supported on said base in spaced facing relationship to said tool head; said tool head and said fixture head being constructed and arranged so as to provide for relative movement therebetween; a workpiece guideway on said base disposed between said tool head and said fixture head transversely of said base and extending outwardly from both sides of said base; a transfer mechanism carried by said base in position to advance a workpiece on said guideway in a controlled rolling movement into a work position between said fixture head and said tool head and a finished workpiece out of the work position simultaneously; a chuck mechanism in said fixture head operable to receive and clamp a circular workpiece in the work position to said fixture head; means engageable with a workpiece in the work position and operable to position the workpiece so that its axis is parallel to the axis of said tool; power means in said fixture head operably connected to actuate said chuck mechanism in a clamping or unclamping action; power means on said tool head operably connected to drive said tool; and power means in said base operably connected to effect relative movement between said fixture head and said tool head.

5. In a machine tool organization for operating upon a circular workpiece; a base; a workpiece guide means carried by said base transversely thereof; a plurality of stations spaced along said guide means comprising a loading station; a work station and a receiving station; a work fixture mounted on said base on one side of said guide means at said work station; a chuck mechanism carried by said work fixture and adapted to receive and clamp a workpiece to said work fixture when said workpiece is in the work station; power means carried by said work fixture and operably connected to actuate said chuck mechanism in a clamping or unclamping action; a tool head mounted on said base on the opposite side of said guide means at said work station; said work fixture and said tool head being adapted for relative movement in respect to each other; a cutter rotatably supported in said tool head for performing a work operation on the workpiece; power means carried by said base and operably connected to drive said cutter carried by said tool head; a transfer mechanism carried by said base in position to roll a workpiece from the loading station into the work station and a finished workpiece out of the work station into the receiving station when coupled to workpieces in said stations, said transfer mechanism comprising; a first member adapted to be moved axially; power means connected to move said first member axially; a second member adjacent to said first member and adapted to be rotated between two positions; power means operably connected to rotate said second member; a plurality of arms carried by said second member for rotation with it into or out of workpiece engagement and for axial movement relative to it; means connected to said first member for movement with it and operably disposed to engage the arms on said second member to enforce movement of said arms on said second member in the direction of movement of said first member; a workpiece engaging roller rotatably mounted on the free end of each of said arms, said rollers of said arms being engageable with workpieces in said loading station and said work station and operable upon movement of said first member in one direction to roll workpieces on said guide means from the loading station into the work station and from the work station into the receiving station; a yieldable backing plate for a workpiece in the work station to maintain the workpiece upright on said guide means so that said chuck mechanism when actuated will operate to clamp the workpiece to said fixture head with its axis coinciding with the axis of said cutter, said backing plate being carried by said tool head in a forward position to cooperate with said chuck mechanism to maintain the workpiece in an upright position so that said chuck mechanism may engage and securely hold the workpiece in an upright position in axial alignment with said cutter; and power means connected to effect relative movement between said tool head and said work fixture; whereby a workpiece may be rolled into said work station from said loading station and when in the work station held upright therein by said backing plate and said chuck mechanism will effect a clamping of the workpiece to the work fixture and relative movement between the tool head and the work fixture may be initiated to effect a work operation upon the workpiece.

6. In a machine tool adapted to perform a work operation on circular workpieces supplied thereto comprising: a base having a rotating work performing member mounted thereon; a chuck head having an axial bore mounted on said base in facing relationship to the said work performing member; said chuck head and said work performing member being adapted for relative movement; a plurality of radially movable jaws mounted on the face of said chuck head and disposed about the bore; a plurality of fulcrumed jaw actuating arms; each of said arms having an end connected to an associated jaw mounted on said chuck head; a cylindrical member having a plurality of cam portions thereon movably mounted within said chuck head in concentric relationship to the bore and in position so as to enable the opposite ends of said arms to be engageable with the cam portions thereon; resilient means in said chuck head in engagement with the opposite ends of said arms to forcefully engage the ends thereof with the cam portions on said cylindrical member; power means carried by said chuck head and operably connected to reciprocate said cylindrical member axially for effecting a like movement of said cam portions to cause a movement of said jaws radially into or out of clamping engagement; a workpiece guideway for rotatably supporting a circular workpiece for movement from a loading station to a work station and from said work station to a receiving station, said guideway being disposed between said fixture head and said work performing means; a workpiece advancing member having workpiece engaging rollers spaced thereon in a manner so that the rollers thereof when engaged with workpieces in said loading station and said work station will rotatably advance the workpieces in a controlled movement; means on the machine tool along said guideway to maintain the workpiece in an upright condition; power means connected for effecting relative movement between said chuck head and the said work performing means to effect a work operation; and means connected to reciprocate said workpiece advancing member; whereby a workpiece supplied to said loading station and a finished workpiece in said work station may be advanced in a controlled movement and said jaws of said chuck head may be actuated to secure and hold a new workpiece advanced from the loading station into the work station and relative movement between the chuck head and the work performing member may be initiated to accomplish a work operation on the workpiece and the work performing member in performing a work operation on the workpiece may extend into the bore provided in said chuck head.

7. In a machine tool adapted to perform a cutting operation on a circular workpiece supplied thereto comprising: a base having work cutting means mounted thereon; a chuck head supported on said base and having work engaging elements operable to hold a circular workpiece in an upright condition in axial alignment with said cutting means, said chuck head having an axial bore the axis of which coincides with the axis of the said cutting means; power means connected to effect relative movement between said chuck head and the said cutting means; a circular workpiece supporting guideway disposed between said chuck head and said cutting means for supporting and guiding a circular workpiece for rolling movement from a loading station to a work station; a workpiece advancing member having workpiece engaging rollers actuatable into and out of workpiece engagement, said rollers being spaced on the advancing member so that workpieces in the loading station and the work station are rotatably advanced in a controlled rolling movement when said advancing member is actuated; means extending through the stations to maintain the workpiece at rest in an upright condition on said guideway, said means at the work station being yieldable upon movement of said head relative to the cutting means in a work operation; whereby a circular workpiece in said loading station and a finished workpiece in said work station may be rolled out of the respective station in a controlled movement of advancement and the workpiece moved from the loading station to the work station will be secured to said head in axial alignment with the cutting means and relative movement between the head and cutting means may be initiated to perform a work operation on the workpiece and during the work operation an extending portion of the cutting means will be received within the bore of said head to enable the closing movement between said head and the cutting means to be accomplished.

8. In a machine tool comprising; a loading station; a work station; an unloading station; all of said stations being successively disposed along a continuous path along which workpieces are progressed through said stations; a fixture head; a cutter head; a cutter rotatably supported in said cutter head; said fixture head and said cutter head being mounted in axial alignment at said work station on either side of the continuous path along which said stations are disposed; a transfer mechanism operable when coupled with workpieces in said loading station and said work station to rotatably advance the workpieces to the next adjacent stations in a controlled movement of advancement along the continuous path; a chuck mechanism carried by said fixture head and operable to clamp and support a workpiece at said work station in axial alignment with the cutter of said cutter carrying tool head, said chuck mechanism comprising at least three chuck jaws movably carried on the face of said fixture head; retracting means in said fixture head operably connected to retract the bottom ones of said jaws within the interior of said fixture head when said jaws are in an unclamped condition to clear the path along which the workpieces are progressed; a first power source carried by said fixture head and operably connected to actuate said jaws in a clamping or unclamping action; a second power means carried in said fixture head and operably connected to actuate said jaw retracting means; power means connected to effect relative movement between said fixture head and said tool head; and power means connected to drive said cutter; whereby a workpiece in said loading station may be rotatably advanced into said work station and a finished workpiece in said work station may be rotatably advanced into said unloading station simultaneously in a controlled movement and the jaws of said chuck mechanism may be extended outwardly of said fixture head in position to engage the new workpiece in said work station and thereafter actuated to clamp the workpiece to the fixture head in axial alignment with said cutter of said cutter head, and relative movement between the said fixture head and the said cutter head may be initiated to perform a work operation on the workpiece.

9. In a machine tool adapted to perform a work operation on a circular workpiece supplied thereto comprising; a base having work performing means rotatably supported thereon; a fixture head mounted on said base in facing relationship to the work performing means; said fixture head and the work performing means being arranged and constructed for relative movement; at least three radially movable jaws mounted on the face of said fixture head; a plurality of fulcrumed jaw actuating arms, each of said arms having an end connected to an associated jaw; a cam member having a camming surface movably supported in said fixture head in position so as to enable the opposite ends of said fulcrumed arms to have engagement with the cam surface thereon; a pair of blocks movably supported in said fixture head for axial movement, said blocks each pivotally supporting one of said arms and thereby the said jaw associated therewith for movement with it; first power means carried by said fixture head and operably connected to move said cam member into or out of camming engagement with the ends of said arms for moving said jaws into and out of operating position; second power means in said fixture head operably connected to move said blocks axially thereby effecting movement of said jaws associated with said arms that are pivotally supported in said blocks inwardly or outwardly of said fixture head; a guideway disposed between said fixture head and the work performing means and operable to rotatably support a circular workpiece thereon; power means connected to effect relative movement between said fixture head and the work performing means; and transfer means carried by said base operably connected to rotatably move a circular workpiece along said guideway into a position between said fixture head and the work performing means; whereby the said blocks may be actuated to effect a retraction of said jaws associated therewith to permit the workpiece to be rotatably moved into the work position and said blocks actuated to advance the said jaws outwardly into position to engage the circular workpiece and said cam member may be actuated to pivotally move all of said jaws into clamping engagement with the workpiece and relative movement between said fixture head and the work performing means may be initiated to accomplish a work operation on the workpiece.

10. In a machine tool for operating upon a circular workpiece comprising; a guideway for supporting a workpiece in a path of travel; transfer means adapted to roll a circular workpiece along said guideway to a predetermined position; a fixture head disposed on one side of said guideway at a predetermined position, said fixture head having a pair of blocks supported therein for movement parallel to the axis of said head; each of said blocks having their outer ends provided with slideways disposed radially from a common axis; a jaw element slidably supported in each of said slideways of each of said blocks; a slideway on said fixture head; a jaw element slidably supported in said slideway; a jaw actuating lever arm pivotally supported in each of said blocks for movement with it, said lever arms each having one end thereof operably connected to an associated jaw element to actuate it radially; a lever arm pivotally supported in said fixture head and having one end connected to actuate the associated jaw element radially; a cam member supported in said fixture head for axial movement, said cam member having a cam surface in engagement with the opposite ends of all of said lever arms to actuate said lever arms in their pivotal movement for moving said jaws into and out of engagement with a workpiece; power means connected to actuate said blocks axially; and a second power means in said fixture operably connected to actuate said cam member axially for moving said jaws into and out of engagement with a workpiece; a tool head disposed on the opposite side of said guideway at the predetermined position; a tool rotatably supported in said tool head with its axis coinciding with the common axis about which said jaw elements are radially movable; a power source carried by said tool head and operably connected to drive said tool; and power means connected to effect relative movement between said fixture head and said tool head; whereby two of said jaw elements may be retracted to a non-interfering position to permit of advancement of a circular workpiece along said guideway and the retracted jaw elements may be returned into position to engage the workpiece and all of said jaw elements actuated to clamp the circular workpiece to the fixture head and relative movement between the fixture head and the tool head may be initiated so that the rotating tool may perform a work operation on the circular workpiece.

11. In a machine tool for performing a work operation upon a circular workpiece; a base; a cutter head mounted on said base; a cutter rotatably supported in said cutter head; a fixture head mounted on said base in facing spaced relationship to said cutter head; said fixture head and said cutter head being constructed and arranged so as to provide for relative movement; a workpiece guideway carried by said base and disposed between said fixture head and said cutter head; transfer means carried by said base and operable when coupled to workpieces on said guideway to simultaneously roll a workpiece into a work position and a finished workpiece out of the work position; said fixture head having at least three jaw elements operable to effect a clamping of a workpiece to said fixture head, said jaw elements being disposed on the face of said fixture head and adapted to be movable radially from a common axis, said jaw elements being disposed on the face of said fixture head so that two of said jaw elements are disposed equiangularly on either side of a vertical center line through which the axis of the cutter passes to thereby effect a cradling of the workpiece, said third one of said jaw elements being disposed with its axis concentric with the vertical center line about which said other two jaw elements are spaced; means in said fixture head to retract the bottom two of said jaw elements comprising; a pair of slide members slidably supported in said fixture head, the outer ends of said slide members comprising a portion of the face of said fixture and each operably constructed to slidably support one of the bottom ones of said jaw elements; a first jaw actuating lever arm pivotally supported in said fixture head and having one end operably connected to actuate the top one of said jaw elenents; a second jaw actuating lever arm pivotally supported in one of said slide members and having one end thereof connected to actuate the associated jaw element carried by said slide member; a third jaw actuating lever arm pivotally supported in the other of said slide members and having one end thereof connected to actuate the associated jaw element carried by said other slide member; a cam member having a peripheral cam surface slidably supported in said fixture head and disposed so that the opposite end of all of said lever arms are in engagement with the cam surface thereof so that movement of said cam member will actuate said levers for clamping and unclamping a workpiece to said fixture; a first power means in said fixture head connected to reciprocate said slide members simultaneously; a second power means in said fixture head connected to actuate said cam member; a third power means carried by said tool head and operably connected to drive said tool; and a fourth power means in said base operably connected to effect relative movement between said fixture head and said tool head; whereby the lower two of said jaw elements may be retracted to provide a clear path for the movement of a circular workpiece into and out of the work position, and the lower two of said jaws may be advanced into position to engage the workpiece in the work position, and all of said jaw elements may be actuated to clamp the workpiece to the fixture head, and said fourth power means may be actuated to effect a relative movement between said head to thereby accomplish a work operation on the workpiece.

12. In a machine tool having a fixture head operable to position and hold a car wheel in an upright position; a support having an axis; a plurality of jaw members carried by said support in angularly spaced relationship, said jaw members being arranged so that at least two of said jaw members act to engage a car wheel from the bottom thereof and at least one of said jaws being disposed to engage the car wheel from the top thereof, the arrangement being such that said jaw members, when actuated, act to position the car wheel in axial alignment with the axis of said support; an actuating arm for each of said jaw members, said actuating arms being pivotally mounted in said support and each having one end thereof connected to move its associated jaw in a clamping or unclamping action upon pivotal movememnt of said actuating arms; an operating member in said support operably connected to the opposite ends of said actuating arms to effect pivotal movement of all of said actuating arms simultaneously; retraction means in said support operably connected to effect a retraction of the two bottom jaw members out of the plane in which said jaws are operative to act upon a workpiece to thereby provide a path for movement of a car wheel into and out of the fixture head; and means operable to effect a positioning of a car wheel in the fixture head to maintain the car wheel in an upright position so that its axis is disposed parallel to the axis of the said support.

13. In a car wheel boring machine having a fixture head operable to position and hold a car wheel in an upright position; a support having an axis; a plurality of jaw members carried by said support in angularly spaced relation, said jaw members being disposed so that at least two of the said jaw members act to engage a car wheel from the bottom thereof when the car wheel is in an upright position, and at least one of said jaw members being disposed to engage the car wheel from the top thereof, the arrangement being such that the said jaw members act to position the car wheel in axial alignment with the axis of said support; a lever arm pivotally mounted in said support for each of said jaw members, said lever arms each having an end thereof connected to an associated jaw member and operable to actuate said jaw members in a clamping or unclamping action upon pivotal movement of the said lever arms; an operating member in said support operably connected to the opposite ends of said lever arms to effect simultaneous pivotal movement of the said lever arms for operating said jaw members; and retracting means in said support operably connected to effect retraction of the said two bottom jaw members and their associated lever arms inwardly into said support to thereby provide a path for movement of a car wheel into and out of the fixture head.

14. In a clamping arrangement; a support having an axis; clamping means movable along a line perpendicular to the said axis for clamping a workpiece to said support; an operating member movable along a line parallel to said axis; a slide member carried by said support for movement parallel to said axis; a lever pivotally mounted in said slide member and disposed substantially parallel to said axis, said lever having one end thereof connected to said clamping means and operable to actuate said clamping means upon pivotal movement of the said lever; a cam surface on said operating member disposed to engage the opposite end of said lever to effect pivotal movement of said lever; a first power means operably connected to move said slide member in either direction parallel to the said axis; and a second power means operably connected to actuate said operating member and its associated cam surface for pivoting said lever to operate said clamping means; whereby said first power means may move said slide member and thereby said lever and said clamping means into a workpiece engaging position and said second power means may move said operating member in one direction to effect pivotal movement of said lever thereby actuating said clamping means in a clamping action.

15. In a clamping arrangement; a support having an axis; a plurality of clamping means disposed in cooperating radial positions about said axis; at least one of said clamping means being movable along a line perpendicular to the said axis for effecting a clamping of a workpiece to said support; an actuating element for said clamping means comprising; a retracting member mounted in said support for movement along a line parallel to said axis in a retracting or advancing movement; a lever arm pivotally mounted in said retracting member, said lever arm having one end connected to said movable clamping means to effect movement of said movable clamping means upon pivotal movement of the said lever arm; a guideway in said retracting member in which said clamping means is supported for movement along the line perpendicular to the said axis of the support, said retracting member being operable to carry said clamping means with it in a retracting or advancing movement; and operating means in said support operably connected to the opposite end of said lever arm to actuate said lever arm in a pivotal movement; whereby said retracting member may be moved in an advancing movement to position the said associated clamping means in cooperating position relative to a workpiece and said operating means may be actuated to pivot said lever arm associated therewith to effect movement of the said movable clamping means in a clamping action.

16. In a transfer mechanism for advancing rollable workpieces in a rolling movement; a fixed plate; said fixed plate having beveled sides; a carrier plate supported for axial movement on said fixed plate; a plurality of rollers rotatably carried by said carrier plate, said rollers being disposed so that the peripheries of said rollers engage said beveled surfaces to maintain said carrier plate in position on said fixed plate; a plurality of supporting rollers rotatably carried by said carrier plate, said supporting rollers being disposed in said carrier plate in a position so that their peripheries roll upon said fixed plate to movably support said carrier plate thereon; a secondary member rotatably supported by said fixed plate; a plurality of arms carried by said secondary member in spaced relationship, said arms being mounted on said secondary member to rotate with it and adapted to be movable axially relative to it; a roller rotatably mounted on each of said arms in position to be engageable with the rollable workpieces when said arms are rotated in one direction; means on said carrier plate and operably disposed to engage said arms to enforce movement of said arms in the direction of movement of said carrier plate; power means operably connected to rotate said secondary member in either direction for pivoting said arms to move said rollers in engagement or out of engagement with said workpiece, and power means connected to move said carrier plate in either direction for moving said arms and their associated rollers to advance the workpieces engaged by said rollers.

17. In a transfer mechanism for advancing rollable workpieces; a fixed plate having beveled side portions; a carrier plate supported for axial reciprocation on said fixed plate; a plurality of rollers rotatably carried by said carrier plate in position so that their peripheries engage the beveled side portions of said fixed plate to thereby maintain said carrier plate on said fixed plate; a plurality of supporting rollers rotatably carried by said carrier plate in position to engage said fixed plate to thereby movably support said carrier plate on said fixed plate; a plurality of brackets on said carrier plate for movement with it, said brackets being arranged on said carrier plate in spaced apart pairs; a secondary member rotatably supported in said brackets and connected to said fixed plate in a manner to be axially immovable; a plurality of arms mounted on said secondary member for rotation with it and adapted to be movable axially relative to said secondary member, said arms being disposed on said secondary member in a manner that each of the pairs of said brackets will engage an individual arm on said secondary member to enforce movement of said arms on said secondary member with said carrier plate; a roller rotatably secured to each of said arms in position to engage the rollable workpieces when said secondary member is rotated in one direction; an adjustable stop on said carrier plate for each of said arms for engagement therewith when said arms are rotated to engage said rollers thereof with the rollable workpieces to locate said rollers in desired relationship with said rollable workpieces; a power source supported by said fixed plate and operably connected to effect rotation of said secondary member in either direction, and means operable to effect axial reciprocation of said carrier plate for moving said arms and their associated rollers to advance the workpieces engaged by said rollers.

18. In a transfer mechanism for advancing rotatable workpieces; a fixed member; a carrier member supported for axial reciprocation on said fixed member; a plurality of brackets on said carrier member, said brackets being arranged on said carrier member in spaced apart pairs; a secondary member rotatably supported in said brackets and connected to said fixed member in a manner to be restrained from axial movement relative to it; a plurality of roller arms carried by said secondary member operably connected to rotate with said secondary member and adapted to be movable axially relative to said secondary member, said roller arms being disposed on said secondary member between the pairs of said brackets; a first power means carried by said carrier member and operably connected to effect reciprocation of said carrier member; and a second power means supported by said fixed member and operably connected to effect rotation of said secondary member; whereby when said first power means is actuated in one direction to effect movement of said carrier plate in one direction, movement of said roller arms in the same direction will be enforced by means of said brackets to move the rotatable workpieces engaged by said roller arms and when said second power source is actuated in one direction said secondary member is rotated to effect rotation of said roller arms out of workpiece engagement.

19. In a machine tool having a horizontally disposed power driven tool spindle; a retractable work head carried for rectilinear movement along a path parallel to the axis of said spindle; a first reversible power source connected to move said head from a retracted position toward and away from said spindle; a disengageable chuck carried by said head and operable to clamp a circular workpiece in such position that the axis thereof is aligned with the axis of said spindle; a second reversible power source connected to actuate said chuck; a horizontally disposed support rail in combination with a plurality of upwardly spaced guide rails positioned between said spindle and said work support; an upwardly spaced laterally movable support plate positioned for movement toward said spindle in parallelism with said head; said movable plate being adapted to coact with said stationary guide rails for guiding a circular workpiece into an operating station in approximate axial alignment with said spindle; means connected to normally urge said plate away from said spindle; a resettable transfer mechanism operative to advance a circular workpiece along said rails from a loading station into the operating station; said transfer mechanism being operable to position and retain a circular workpiece in the operating station until it is chucked to said work support; means responsive to arrival of a next workpiece in the loading station connected to actuate said first power source for moving said head outwardly a predetermined distance until said chuck urges the workpiece into engagement with said oppositely urged movable plate; control means responsive to arrival of said head at predetermined position connected to effect resetting movement of said transfer mechanism, to energize said second power source for actuating said chuck into clamping engagement with the workpiece, and to condition said first power source for reduced rate operation; a chuck responsive control connected to energize said first source to move the clamped workpiece in opposition to said support plate in a manner to engage a cutter carried by said tool spindle; a reverse control connected to reverse said first power source for effecting return movement of said head; and sequencing control means operative in response to return head movement connected to energize said second source for disengaging said chuck for redepositing the machined workpiece on said support rail, to actuate said first source for effecting continued return movement of said work support to fully retracted position, and to actuate said reset transfer mechanism for advancing the next workpiece into the operating station.

20. In a machine tool having a machining station for performing a machining operation on wheels; a frame; guide means supported by said frame and adapted to support the wheels in an upright position for rolling movement and guide them in a path of travel into and out of the machining station; power actuated transfer means operably connected to roll the wheels along said guide means to locate them successively at the machining station and to roll the completed wheels out of the machining station; clamping means mounted on said frame and operative to clamp the wheels in position in the machining station; a source of power operably connected to actuate said clamping means; a tool head mounted on said frame; a cutting tool carried by said tool head in position to operate on a wheel clamped in the machining station; feeding means operable to produce relative movement between said tool and the wheel in the machining station to effect a feeding movement for completing the machining operation on the wheel; control means operably connected to regulate said source of power for actuating said clamping means to clamp and unclamp the wheel in the machining station; and feed control means operably connected to regulate said feeding means and responsive to the operation of said clamping means for initiating the feeding movement when said clamping means has secured a wheel in the machining station.

21. In a machine tool having a machining station for performing a machining operation on wheels; a frame; guide means supported by said frame and adapted to support the wheels in an upright position for rolling movement and guide them in a path of travel into and out of the machining station; a power actuated transfer mechanism operably connected to roll the wheels along said guide means to locate them successively at the machining station and to move the wheels out of the machining station upon the completion of a machining operation; aligning means carried by said frame to engage the wheel located in the machining station and position it in proper alignment for the accurate performance of the machining operation; a chuck carried by said frame to engage the aligned wheel at the machining station and clamp it in the aligned position; a tool head mounted on said frame; a cutting tool carried by said tool head in position to operate on a wheel clamped in the machining station; and means operable to produce relative movement between said tool head and the wheel in the machining station to effect a feeding movement for completing the machining operation on the wheel.

22. In a mechanism for advancing wheels in increments through a plurality of stations; a frame; support means mounted on said frame and operative to support the wheels in an upright position for rolling movement; guide means carried by said frame to guide the rolling wheels in a path of travel through the several stations; a plurality of arms supported by said frame for movement between an operating position and an inoperative position; a roller carried at one end of each of said arms in position to be engageable with the periphery of a wheel when its associated arm is in the operating position; a first source of power operably connected to simultaneously move said arms between their inoperative positions and their operating positions; a second source of power operably connected to produce lateral movement of said arms in either direction between a retracted location and an advanced location with the advancing movement occurring when the arms are in the operating position, the advancing movement serving to move said rollers into engagement with the peripheries of the respective wheels and roll each of the engaged wheels in an advancing movement from one station to the succeeding station, said second power source being reversible to move said arms to the retracted location preparatory to initiating another wheel advancing movement.

References Cited by the Examiner
UNITED STATES PATENTS

| | | | |
|---|---|---|---|
| Re. 23,969 | 3/55 | Bowen | 77—3 |
| 434,913 | 8/90 | Brill | 279—120 |
| 566,725 | 8/96 | Cherry | 279—120 |
| 828,695 | 8/06 | Wellington | 279—120 |
| 1,060,926 | 5/13 | McEldowney. | |
| 1,105,301 | 7/14 | Pierce | 82—2.7 |
| 1,392,304 | 10/21 | Davis. | |
| 1,615,372 | 1/27 | Fiegel | 77—3 |
| 1,661,017 | 2/28 | Stolle | 82—2.7 |
| 1,774,656 | 9/30 | Miller. | |
| 1,982,711 | 12/34 | Vickers | 60—52 |
| 2,102,865 | 12/37 | Vickers | 60—52 |
| 2,103,530 | 12/37 | Henry | 60—52 |
| 2,238,328 | 4/41 | Johnson | 82—2 |
| 2,368,259 | 1/45 | Mathys | 77—3 |
| 2,391,487 | 12/45 | Snader | 77—1 |
| 2,570,660 | 10/51 | Gamble. | |
| 2,584,466 | 2/52 | Kaserman. | |
| 2,644,999 | 7/53 | Hill | 82—2.7 |
| 2,703,242 | 3/55 | Sloan | 279—4 |
| 2,808,746 | 10/57 | Blomquist | 198—221 |
| 2,864,270 | 12/58 | Mitchell | 77—5.1 |
| 2,973,532 | 3/61 | Bosl et al. | 51—215 |

ANDREW R. JUHASZ, *Primary Examiner*.

FRANK H. BRONAUGH, JOHN C. CHRISTIE, FRANK E. BAILEY, *Examiners*.